(12) United States Patent
Rehman et al.

(10) Patent No.: US 9,971,803 B2
(45) Date of Patent: May 15, 2018

(54) METHOD AND SYSTEM FOR EMBEDDING THIRD PARTY DATA INTO A SAAS BUSINESS PLATFORM

(71) Applicant: ORACLE INTERNATIONAL CORPORATION, Redwood Shores, CA (US)

(72) Inventors: Muhammad Rehman, San Jose, CA (US); Ramin Modiri, Saratoga, CA (US); Pradeep Kotha, San Ramon, CA (US); Azmat Tanauli, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 367 days.

(21) Appl. No.: 14/611,132

(22) Filed: Jan. 30, 2015

(65) Prior Publication Data
US 2016/0224615 A1 Aug. 4, 2016

(51) Int. Cl.
*G06F 17/30* (2006.01)
*G06F 3/0484* (2013.01)

(52) U.S. Cl.
CPC .... *G06F 17/30392* (2013.01); *G06F 3/04842* (2013.01); *G06F 17/30864* (2013.01)

(58) Field of Classification Search
CPC ......... G06F 17/30309; G06F 17/30548; G06F 17/30528; G06F 17/30554; G06F 17/30392; G06F 17/30864; G06F 17/30; G06F 3/04842; G06F 3/0482; G06F 3/04817; G06F 3/0481; G06F 3/0484; G06F 21/6245; G06F 17/30867; G06F 17/30604; G06F 17/30979; G06F 7/582; G06F 17/30522; G06Q 50/265; G06Q 10/0637; G06Q 10/063; G06K 9/72; G10L 15/26; G11B 27/034; G11B 27/105; G11B 27/005; G01C 21/3697
See application file for complete search history.

(56) References Cited

U.S. PATENT DOCUMENTS

| | | | |
|---|---|---|---|
| 6,904,449 B1 | 6/2005 | Quinones | |
| 7,536,686 B2 * | 5/2009 | Tan | G06F 8/61 713/100 |
| 8,346,929 B1 | 1/2013 | Lai | |
| 9,094,744 B1 | 7/2015 | Lu | |

(Continued)

OTHER PUBLICATIONS

Akel, Laura, "Oracle ADF 11g Primer-Introduction to the building blocks of a Fusion Web application," An Oracle White Paper, Apr. 2007.

(Continued)

*Primary Examiner* — Anh Ly
(74) *Attorney, Agent, or Firm* — Vista IP Law Group, LLP

(57) ABSTRACT

Disclosed is an improved method, system, and program product to implement a business platform that assigns a server instance and dedicated database to each business customer. A connector is configured to retrieve data from an external data source. The retrieved data is stored in a portion of the dedicated database. A user interface having one or more selectable components is displayed, wherein at least one selectable component, when selected displays the external data.

30 Claims, 22 Drawing Sheets

(56) References Cited

U.S. PATENT DOCUMENTS

| | | | |
|---|---|---|---|
| 2004/0117358 A1* | 6/2004 | von Kaenel | G06F 17/30241 707/E17.018 |
| 2005/0055275 A1* | 3/2005 | Newman | G06Q 30/02 705/14.41 |
| 2007/0162420 A1* | 7/2007 | Ou | G06F 17/30575 707/E17.032 |
| 2008/0084573 A1* | 4/2008 | Horowitz | G06F 17/2229 358/1.13 |
| 2008/0109445 A1* | 5/2008 | Williams | G06Q 30/00 707/E17.009 |
| 2008/0201248 A1 | 8/2008 | Wellons | |
| 2009/0089078 A1* | 4/2009 | Bursey | G06Q 10/101 705/300 |
| 2009/0234860 A1* | 9/2009 | Brown | H04L 67/02 707/E17.001 |
| 2009/0327006 A1 | 12/2009 | Hansan | |
| 2011/0296336 A1* | 12/2011 | Law | G06F 3/0483 715/777 |
| 2012/0035992 A1* | 2/2012 | Tanaka | G06Q 30/0241 705/14.4 |
| 2012/0232955 A1* | 9/2012 | Riazzi | G06Q 30/0204 705/7.32 |
| 2013/0144855 A1* | 6/2013 | Kaul | G06F 17/30598 707/706 |
| 2013/0187926 A1* | 7/2013 | Silverstein | G06Q 10/105 345/440 |
| 2013/0218923 A1* | 8/2013 | Kaul | G06F 17/30864 707/769 |
| 2013/0282509 A1* | 10/2013 | Strong | G06Q 10/00 705/26.4 |
| 2013/0290244 A1* | 10/2013 | Nucci | G06F 15/16 707/609 |
| 2013/0290381 A1* | 10/2013 | Nucci | G06F 17/30073 707/812 |
| 2014/0074539 A1* | 3/2014 | Doering | G06Q 10/06315 705/7.25 |
| 2014/0181020 A1 | 6/2014 | Kreindlina | |
| 2014/0195416 A1 | 7/2014 | Linscott | |
| 2014/0222637 A1 | 8/2014 | Giles | |
| 2014/0280193 A1 | 9/2014 | Cronin | |
| 2014/0280808 A1* | 9/2014 | Du | G06Q 10/0631 709/222 |
| 2014/0351241 A1* | 11/2014 | Leask | G06F 17/30958 707/722 |
| 2014/0351261 A1* | 11/2014 | Aswani | G06F 17/30958 707/741 |
| 2015/0012382 A1 | 1/2015 | Ceribelli et al. | |
| 2015/0120532 A1* | 4/2015 | Jung | G06Q 20/38 705/39 |
| 2015/0193531 A1 | 7/2015 | Mandelstein | |
| 2015/0242106 A1 | 8/2015 | Penha | |
| 2015/0317572 A1* | 11/2015 | Balasubramanian | G06Q 10/063 705/7.11 |
| 2015/0347542 A1 | 12/2015 | Sullivan | |
| 2016/0224194 A1 | 8/2016 | Pacalin et al. | |
| 2016/0224633 A1 | 8/2016 | Rehman et al. | |
| 2016/0267503 A1* | 9/2016 | Zakai-or | G06Q 10/00 707/E17.004 |

OTHER PUBLICATIONS

Pundpal, Anupama, "Oracle Fusion Applications", Installation Guide, 11g Release 8, Jun. 2014, 738 pages.

Hobin, Dona, "Oracle Fusion Middleware", User's Guide for Oracle Business Intelligence Enterprise Edition (Oracle Fusion Applications Edition), 11 g Release 1, Jun. 2012, 988 pages.

Non-final Office Action dated Mar. 23, 2017 for related U.S. Appl. No. 14/611,146.

Non-final Office Action dated Jun. 30, 2017 for related U.S. Appl. No. 14/611,111.

Notice of Allowance and Fee(s) due dated Sep. 12, 2017 for related U.S. Appl. No. 14/611,146.

Notice of Allowance and Fee(s) due dated Jan. 11, 2018 for related U.S. Appl. No. 14/611,111.

* cited by examiner

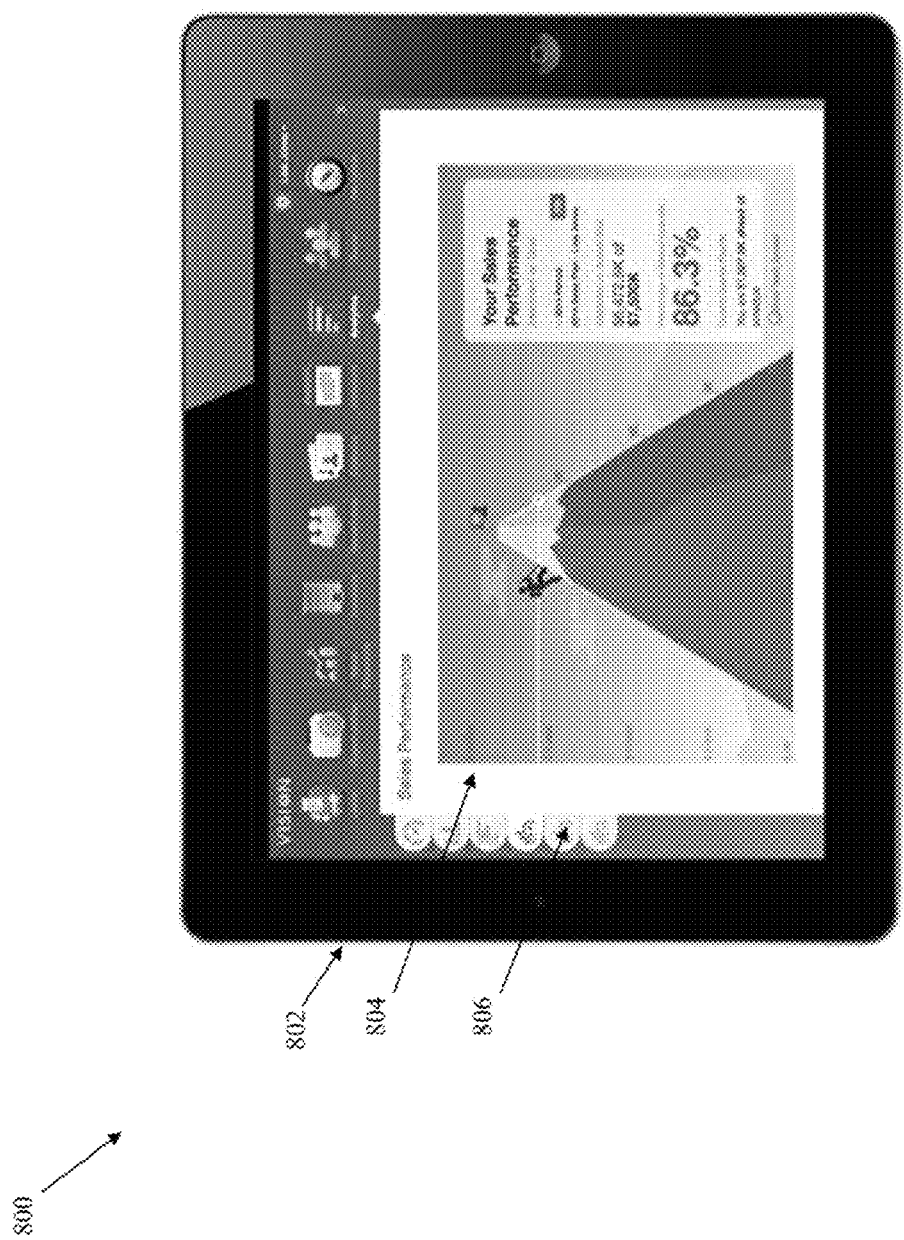

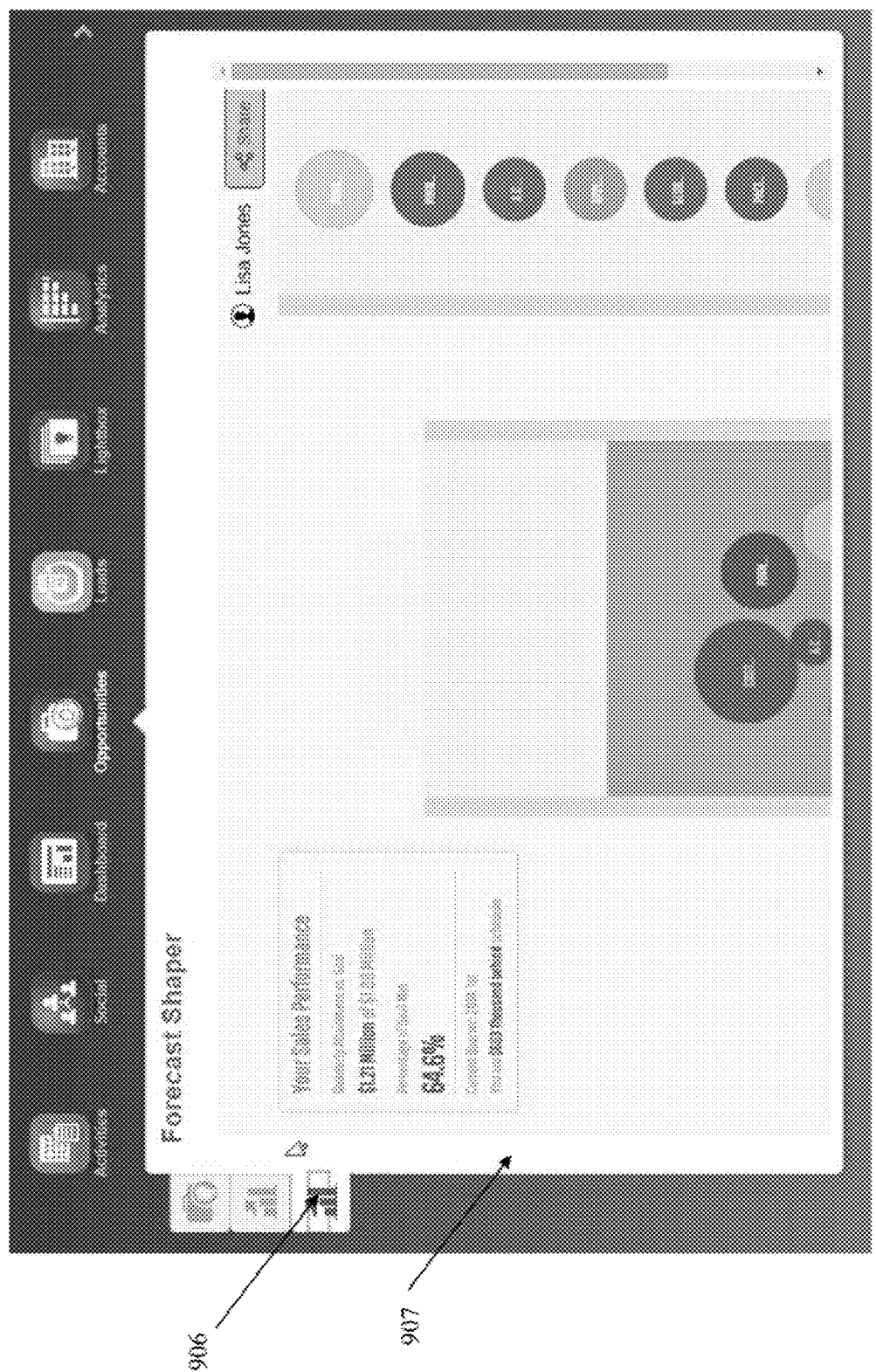

METHOD AND SYSTEM FOR EMBEDDING THIRD PARTY DATA INTO A SAAS BUSINESS PLATFORM

CROSS-REFERENCE TO RELATED APPLICATION(S)

This application is cross-related to U.S. patent application Ser. No. 14/611,111 filed concurrently entitled "METHOD AND SYSTEM FOR PRESENTING BUSINESS INTELLIGENCE INFORMATION THROUGH INFOLETS," U.S. patent application. Ser. No. 14/611/132 filed concurrently entitled "METHOD AND SYSTEM FOR EMBEDDING THIRD PARTY DATA INTO A SAAS BUSINESS PLATFORM". The content of the aforementioned patent applications is hereby expressly incorporated by reference in its entirety.

BACKGROUND

Software-as-a-service ("SaaS") business models have seen a steady rise in the past few years, especially in the realm of enterprise software companies. SaaS refers to a business model in which software may be licensed to one or more business customers on a subscription basis or some other type of payment model and is typically centrally hosted in the cloud. SaaS is typically accessed by a user through a web browser. One of the chief advantages of using SaaS business models is that the burden and cost related to IT maintenance and support is removed or minimized for the business, and instead placed on the SaaS provider (e.g., Oracle Inc., etc.) instead.

By using SaaS platforms, businesses can access and interact with a software service (e.g., a business application, enterprise software, etc.) on the cloud via a remote server, and manage large amounts of data for the enterprise through the SaaS enterprise SaaS service on a subscription basis (i.e., without having to invest in significant costs related to data infrastructure, management, etc.). One such enterprise software solution is offered by Oracle, Inc., (e.g., Oracle Transactional Business Intelligence ("OTBI")). Such an enterprise software platform allows users a comprehensive Business Intelligence tool to manage a set of data related to the user (e.g., business account), provide analytics based on the set of data, and provide different ways of creating business reports, among other capabilities. In the context of enterprise software, one key functionality relates to visualization of multiple data sources in an integrated platform, thereby making it easier for users to interact with the data and analyze the data in a meaningful manner.

SaaS customers typically use several different SaaS platforms to interact with different datasets. Although the different data providers behind these different SaaS platforms attempt to have all-include datasets, none of these SaaS platforms is able to provide all-inclusive datasets because the data originates and is maintained by various providers as a result of particular expertise, insight, or access, manifested through particular data collection and management processes, by the respective provider. As a result, customers may use multiple SaaS platforms, each corresponding to a different provider to gain a deeper understanding as they analyze data. Thus, there is a need for an improved integrated enterprise SaaS platform.

SUMMARY

One or more embodiments of the current application address the above problems by providing an approach to provide an external data retrieval capability to users of a SaaS business platform. In one aspect, a method according to one or more embodiments provides a SaaS platform to a plurality of business accounts. The data associated with a particular customer is directed to a dedicated database associated with a server instance unique to the particular customer. The method also comprises configuring a connector to retrieve data from an external data source, storing data retrieved from the external data source in a portion of the dedicated database of the particular customer, and providing a user interface having one or more selectable components, wherein at least selectable component, when selected, displays data retrieved from the external data source.

In another aspect, a computer program product embodied in a non-transitory computer readable medium, the computer readable medium having stored thereon a sequence of instructions which, when executed by a processor causes the processor to execute a method that provides a software as a service (SaaS) platform to a plurality of customers. The data associated with a particular customer is directed to a dedicated database associated with a server instance unique to the particular customer. The method also comprises configuring a connector to retrieve data from an external data source, storing data retrieved from the external data source in a portion of the dedicated database of the particular customer, and providing a user interface having one or more selectable components, wherein at least selectable component, when selected, displays data retrieved from the external data source.

In yet another aspect, a computer system comprises a computer processor to execute a set of program code instructions, a memory to hold the program code instructions, in which the program code instructions comprises program code to provide a software as a service (SaaS) platform to a plurality of customers, wherein data associated with a particular customer is directed to a dedicated database associated with a server instance unique to the particular customer, to configure a connector to retrieve data from an external data source, to store data retrieved from the external data source in a portion of the dedicated database of the particular customer, and to provide a user interface having one or more selectable components, wherein at least selectable component, when selected, displays data retrieved from the external data source.

Further details of aspects, objects, and advantages of embodiments are described below in the detailed description, drawings, and claims. Both the foregoing general description and the following detailed description are examples only and explanatory, and are not intended to be limiting as to the scope of the disclosure.

BRIEF DESCRIPTION OF THE DRAWINGS

FIG. 8 illustrates an example user interface of the SaaS platform according to one or more embodiments.

FIGS. 9*a*-9*c* illustrate an example series of user interfaces of the SaaS platform according to one or more embodiments.

DETAILED DESCRIPTION

Figure 1:
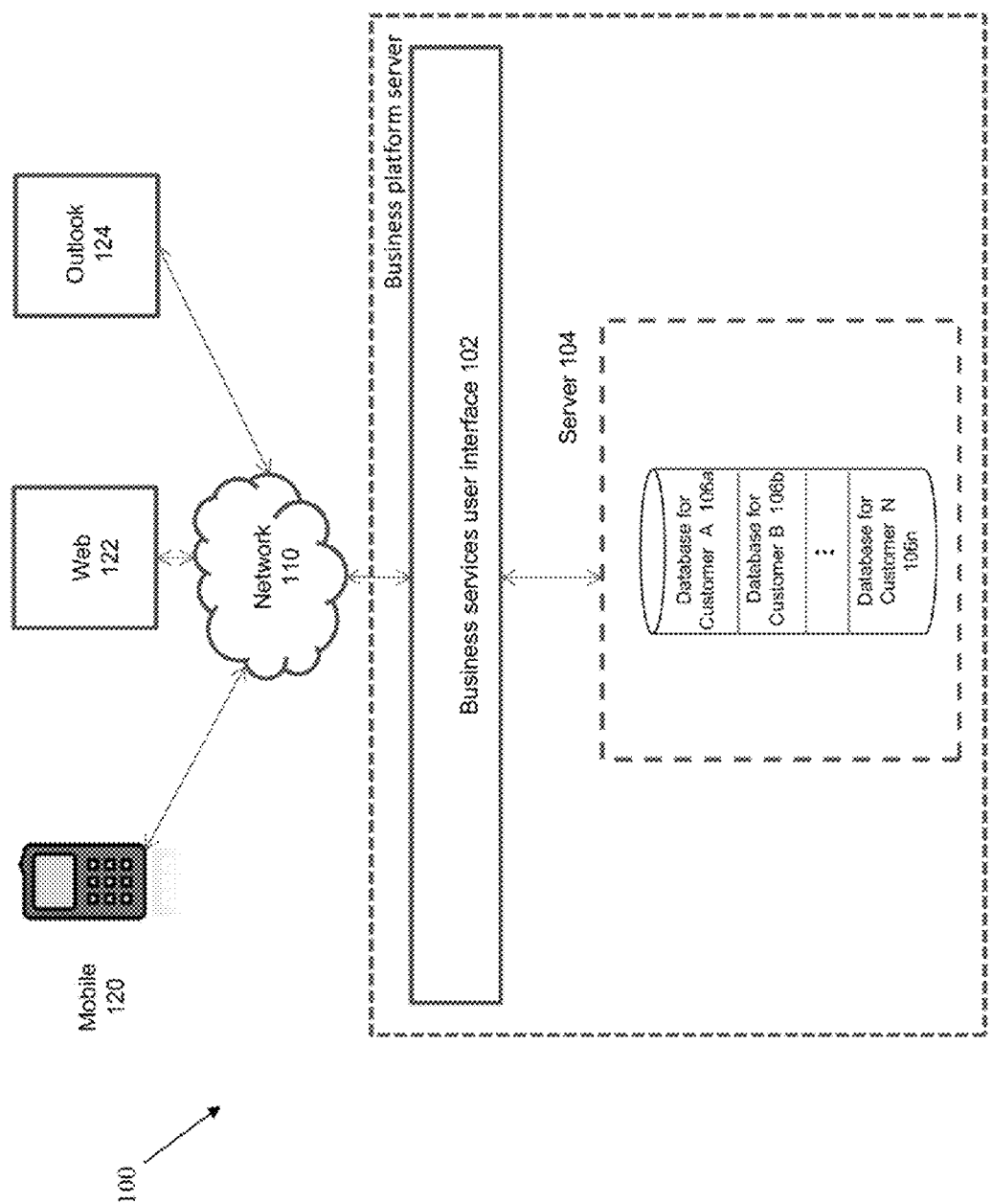
FIG. 1 illustrates a prior art system architecture for a SaaS platform.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention(s) or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of mobile applications that receive additional role and environment information. It is noted, however, that the invention(s) are not limited in its scope to these types of applications and this set of additional information, and indeed, may be applied to other types of applications and information as well.

As noted above, the issue addressed by the present disclosure is that there is a need to import and embed third party analytical data into SaaS platforms. In the context of traditional SaaS platforms, this functionality is either limited or non-existent in large part due to limitations in the data architecture model of traditional SaaS platforms.

To explain, SaaS platforms are typically accessed by multiple business customers, who all access and interact with the application through a common user interface. Although each of the business customer uses the same interface, each business customer is directed (e.g., through an authentication process, etc.) to a dedicated section of the SaaS platform to interact and use the software for their own unique needs. Of course, this is also important for security and privacy purposes so that data associated with one business customer is not accessed by another business customer. To this end, data associated with each business customer or account is directed to a separate section of a shared database.

Referring now to FIG. 1, FIG. 1 is an example of a typical architecture of a SaaS platform in prior art approaches. As shown in FIG. 1, the customer (e.g., a business, sales administrator of a particular business account, etc.) may access the SaaS platform through a mobile phone 120, a web browser 122, an Outlook® browser 124 etc., which connects to a cloud network 110. As shown in FIG. 1, the users all interact with the application through a common user interface 102. However, data associated with each of the customers is stored in a separate section of a shared database 106. For example, 106*a* refers to a database table unique to customer A; 106*b* refers to a database table unique to customer B and so on. It should be appreciated that the SaaS application may be used by hundreds of business customers; thus, the same database 106 is used to store and retrieve data for all the business customers, albeit in different sections. This type of SaaS architecture is typically referred to as a multi-tenant model.

In the context of importing third party data into the SaaS platform, the multi-tenant data architecture model poses a few challenges. Since all the business accounts are essentially sharing a single database, importing third party data into one account is typically unduly taxing and takes up too many resources, thereby affecting remaining business accounts. For example, customer A bringing in external data tends to affect customer B, customer C and so on since they all share the same database. As a result most SaaS platforms typically have strictly enforced limits on what kind of data is stored in the respective database, how much data can be stored, and what data, if any, can be imported. As a result, customers of the SaaS platform are unable to leverage this key functionality and typically are unable to meaningfully integrate third party reports into reports created through the SaaS platform. Additionally, most SaaS enterprise platforms do not invest in the infrastructure to retrieve data from external sources.

To address these concerns, an alternate system architecture of a SaaS enterprise platform may be more beneficial, especially in the context of retrieving third party analytics data. Rather than multiple business customers sharing a single database such that activities related to one database table unnecessarily affect or tax the remaining database tables associated with other business accounts, each business customer (or business account) may be assigned a dedicated server instance and a dedicated database unique to that business account. This model is typically referred to as a virtual tenant model. The virtual tenant model gives the business customer more flexibility and control over the data generated and managed at the SaaS application, and is especially advantageous when it comes to importing desired third party data.

As discussed above, importing third party data has several advantages. One of the main advantages is that it gives the customer more control over what data can be maintained and analyzed through the SaaS platform. For example, in the case of the sales manager example discussed above, the sales manager may be able to get a better sense of the ROI by seeing the marketing data contemporaneously as the sales opportunity data. To explain, rather than using the SaaS business platform solely for analyzing, sales, prices, annual budget information, and having to go through a separate marketing application to understand marketing data and infer the ROI by going back and forth, an integrated platform that allows third party data would allow the customer to more easily understand the ROI. Thus, this functionality may improve the functionality of the SaaS enterprise platform considerably.

Figure 2:
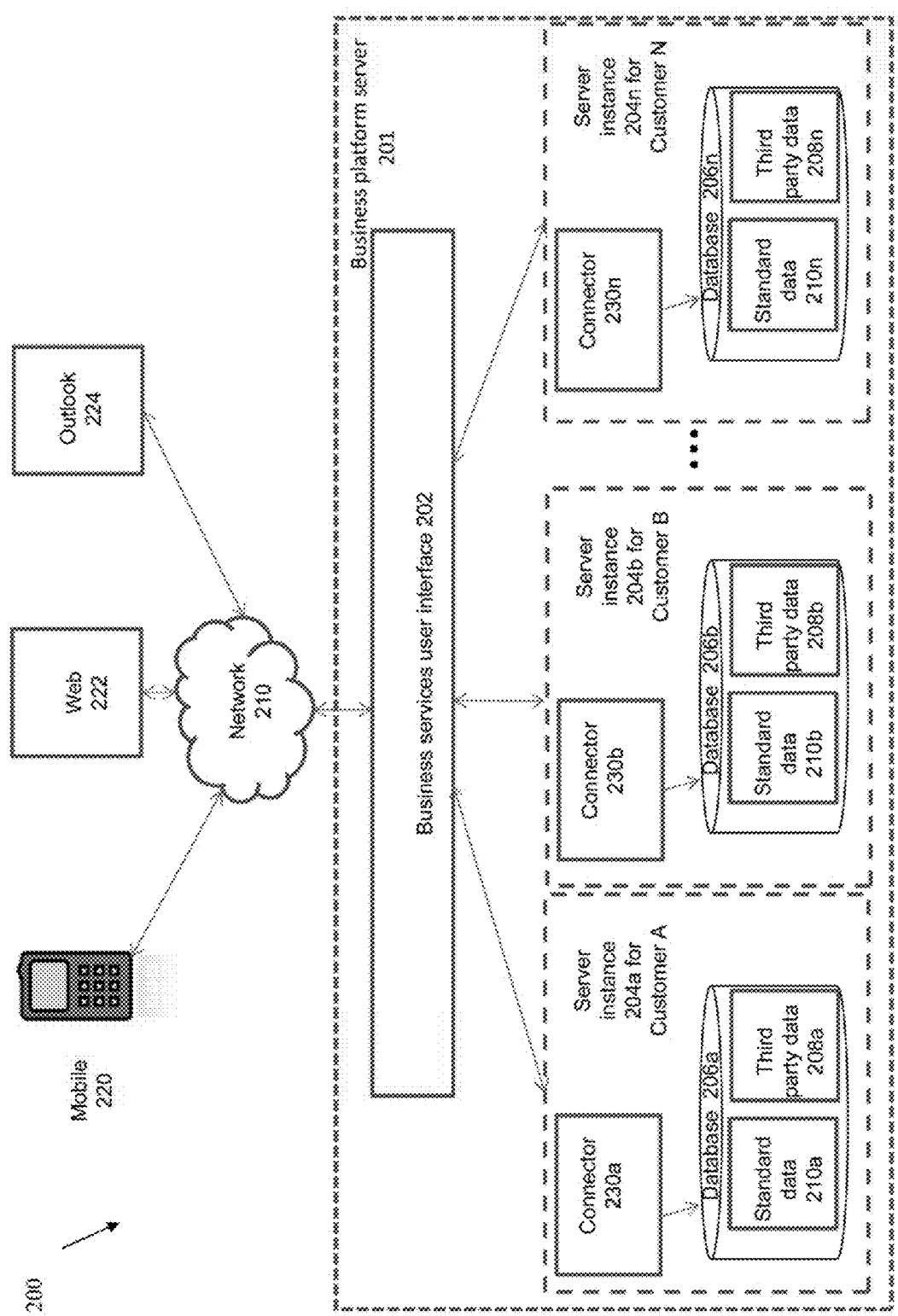
FIG. 2 illustrates a virtual tenant system architecture for a SaaS platform according to one or more embodiments.

Referring now to FIG. 2, similar to FIG. 1, one or more users associated with one or more business accounts may access and interact with the business platform (system 200) through a mobile phone 220 (e.g., smartphone, etc.), a secure web browser 222, an Outlook® browser, etc. Or, in other embodiments, tablet devices may be similarly used to access and interact with the business platform. The tablet device may comprise any type of portable device, including for example, tablet computers, portable readers, PDAs, etc. The mobile telephone device may comprise any mobile device that can suitably access an application on application server, such as smartphones and programmable mobile handsets. It should be appreciated that the above three devices/browsers are mentioned for example purposes only, and other devices/browsers etc. may be similarly used.

Similar to FIG. 1, users interact with the business platform through a common business services user interface 202. As mentioned previously, the user interface 202 may require authentication information (e.g., a login/sign-in screen, a registration screen, etc.) from the user before granting access to the business platform. After the user has been authenticated, the user may be directed to the customer account he/she may be associated with. It should be appreciated that each business customer may be associated with a business customer account. However, multiple users of the same business may access the same business account with their own unique login information. For example, a small business ABC may have a business account with the SaaS application. ABC may have 8 sales reps, 2 sales managers and a Vice President. All 11 employees may be able to access the SaaS application and the business account for ABC through their own individual logins.

However, in contrast to the multi-tenant model, rather than all the business accounts sharing the same database 106, as shown in FIG. 1, in the virtual tenant model, data associated with each business account or customer (e.g., company ABC in the example above) is directed to a separate server instance 204 (e.g., server instances 204a, 204, b, etc.) within the architecture of the SaaS application, as shown in FIG. 2. Each individual server instance 204 hosts a database 206 such that data associated with that business account is exclusively directed to that particular database. The database 206 corresponds to any type of computer readable mediums or storage devices. The computer readable storage devices may comprise any combination of hardware and software that allows for ready access to the data within database. For example, the computer readable storage device could be implemented as computer memory or disk drives operatively managed by an operating system. Database 206 may comprise backend systems containing authentication data for authenticating usernames and passwords, role configuration data for a plurality of roles, and environment mapping data that maps environments to database resources associated with the environment. For simplicity, database 206 is illustrated as a single database for each server associated with each business account, but it should be understood that each database 206 (e.g., database 206a, database 206b, etc.) may comprise a plurality of databases. In addition, each database 206 may comprise backend logic servers or database middleware that processes and manipulates data that is sent to or received from server instance 204.

Thus, as described above, data associated with the account is properly channeled and stored in the appropriate database. It can be appreciated that this system architecture of the SaaS application or business platform immediately allows for more efficient data storage that does not interfere with data associated with other customer accounts also hosted by the business platform.

Specifically, to allow for retrieving third party data into one or more reports or database objects (i.e., database tables), the server instance 204 may further include a connector 230a, 230b, etc., to retrieve data from one or more third party sources. As discussed above, since each business account has its own database instance, the connector 230 associated with one business account does not unduly affect the activities of other business accounts. In one or more embodiments, each of the third party sources corresponds to its own connector to timely retrieve the third party data into the database of the business account. Although FIG. 2 only shows a single connector for illustrative purposes, it should be appreciated that multiple connectors may be part of the system. It should be appreciated that although the connector is illustrated as being part of the server instance 204 in FIG. 2, other embodiments may communicator to an external connector to retrieve the necessary data.

The database 206 comprises both standard data and third party data. Standard data may refer to data that is typically allowed/part of the SaaS offering to customers, while the third party data is data purposefully retrieved based on the user's needs. The enterprise platform allows users to configure the system in a way such that a plurality of third party data can be retrieved. More details on configuration steps will be described further below.

Figure 3:
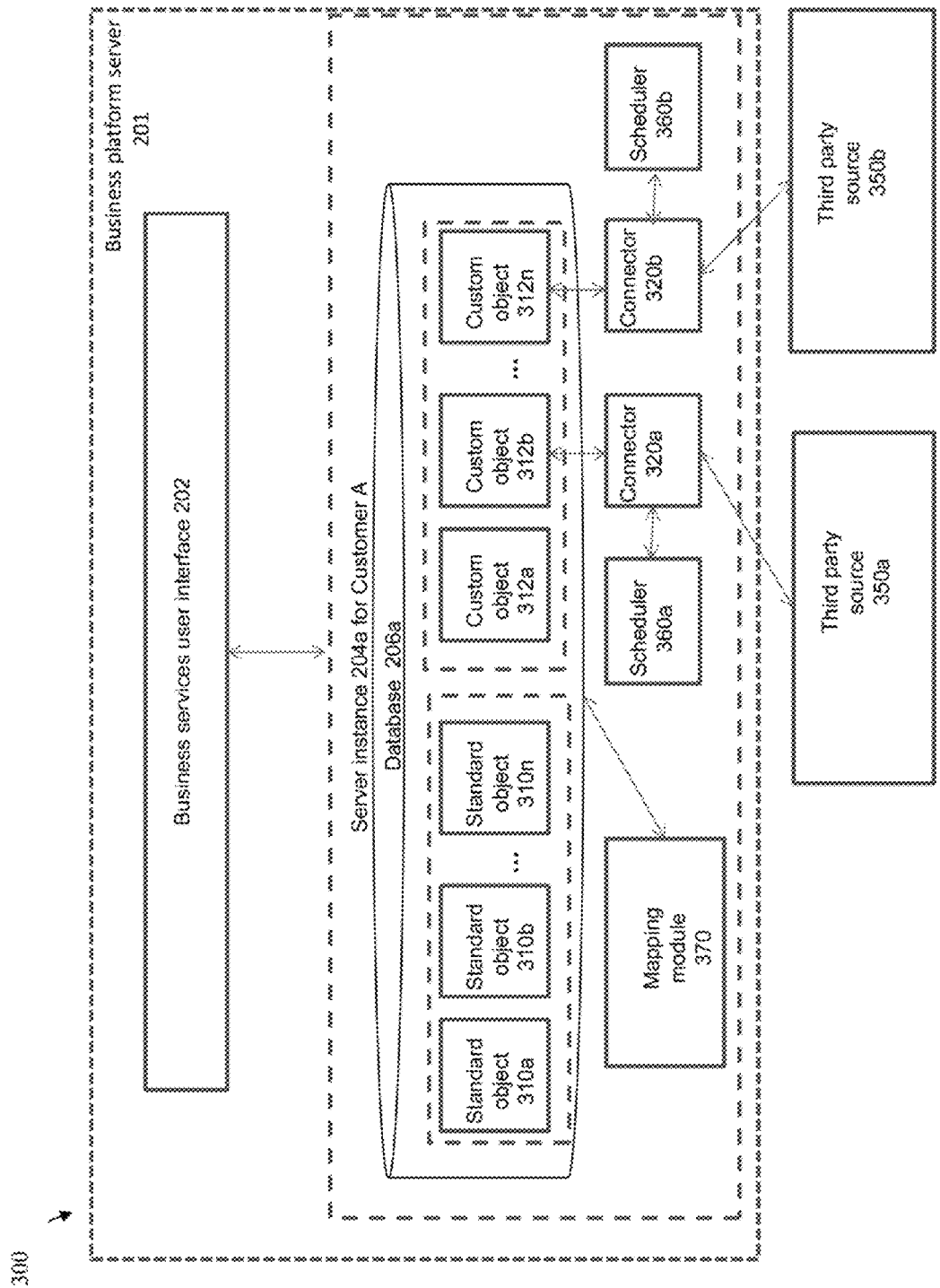
FIG. 3 illustrates a more detailed view of the system of FIG. 2, the system communicating with external data sources according to one or more embodiments.

Referring now to FIG. 3, a more detailed data architecture specifically describing the components of each database instance of a particular business account will be described. As described with reference to FIG. 2, the server instance 204 provides data to the business services user interface 202. The server instance 204 includes the dedicated database instance 206 unique to customer A that stores a set of data desired by the user.

In one or more embodiments, the business offering to each business account may include a set of standard objects 310. For example, the enterprise platform may be configured such that some standard objects routinely utilized by more customers are pre-coded and packaged into the service offering. For example, assuming the enterprise platform system caters to sales departments of companies, standard objects of most interest to customers may include tables such as "Price," "Opportunities," and "Revenue." Given these standard objects, the user advantageously utilizes these standard objects, and simply populates the standard object tables with data related to "Price," "Opportunities," or "Revenue," in the above example. Providing standard objects to the users of the SaaS enterprise platform allows users to readily use the standard objects for data likely to be most relevant without having to re-create tables for more niche purposes. For most customers, the standard objects will likely be sufficient for their report-creation needs. In the illustrated embodiment, the database instance 206 comprises many standard objects 310.

However, for cases in which users require more specific/niche database tables (e.g., data particular to the needs of the particular company, etc.), the system provides the user with options to create custom objects 312. For example, the user may create a table for "Quote" or "Marketing budget" to create reports related to price quotes on one or more sales opportunities or marketing budgets for the particular company. This functionality gives users more flexibility and control over the data, allowing the user to track/analyze and report on any data of interest. In the illustrated embodiment, the database instance 206 also comprises multiple custom objects 312 created by the user. It should be appreciated that both standard objects and custom objects are stored in the same database instance.

More pertinent to the current invention(s), the server instance 204 also comprises one or more connectors 320 that can be configured to pull external data into one or more custom objects. Although the current embodiments illustrate external data being pulled into custom objects, it should be appreciated that third party data can similarly be pulled into standard objects as well.

Following the above example, once the user has created one or more custom objects, the SaaS enterprise platform may further allow importing of third party data into the custom object tables. The one or more connectors 320 may be configured to pull data from a desired source and into the custom object tables 312. As shown in FIG. 3, the connectors communicate with one or more third party sources 350 to periodically retrieve the desired data and into the database table.

In one or more optional embodiments, the server instance 204 may further comprise one or more schedulers 360 to timely pull the data from the third party source. For example, the scheduler may be programmed (e.g., SQL statement) to retrieve data on a daily basis, for example. It should be appreciated that in other embodiments the connector would retrieve live/active data contemporaneously with a database request, rather than use a scheduler. In other embodiments, the data may be retrieved manually on a periodic basis. Regardless of the manner of retrieval, the connector 320 allows retrieval of data from third party sources. For illustrative purposes, the following disclosure will discuss embodiments utilizing a scheduler, but it should be appreciated that other embodiments may not utilize a scheduler.

In one or more embodiments, the server instance 204 may also include a mapping module 370 that stores mapping information between one or more database tables (i.e., standard and/or custom objects) and one or more connectors, and similarly mapping information between one or more connectors to one or more third party sources. The mapping may be one to one, one to many or many to many. The mapping module may be consulted to determine a source and/or destination of retrieved data pulled by the connectors from the third party source.

As discussed in some length above, the virtual tenancy data architecture significantly contributes to this functionality. Since each user/business account is given a dedicated server instance and database instance, pulling data from third party source (which may be computationally expensive activity) does not unduly affect the performance of remaining users of the SaaS enterprise platform. Given the parallel data architecture of the virtual tenancy model, third party data can be safely imported and used by customers for business report and/or analytics.

Figure 4A:
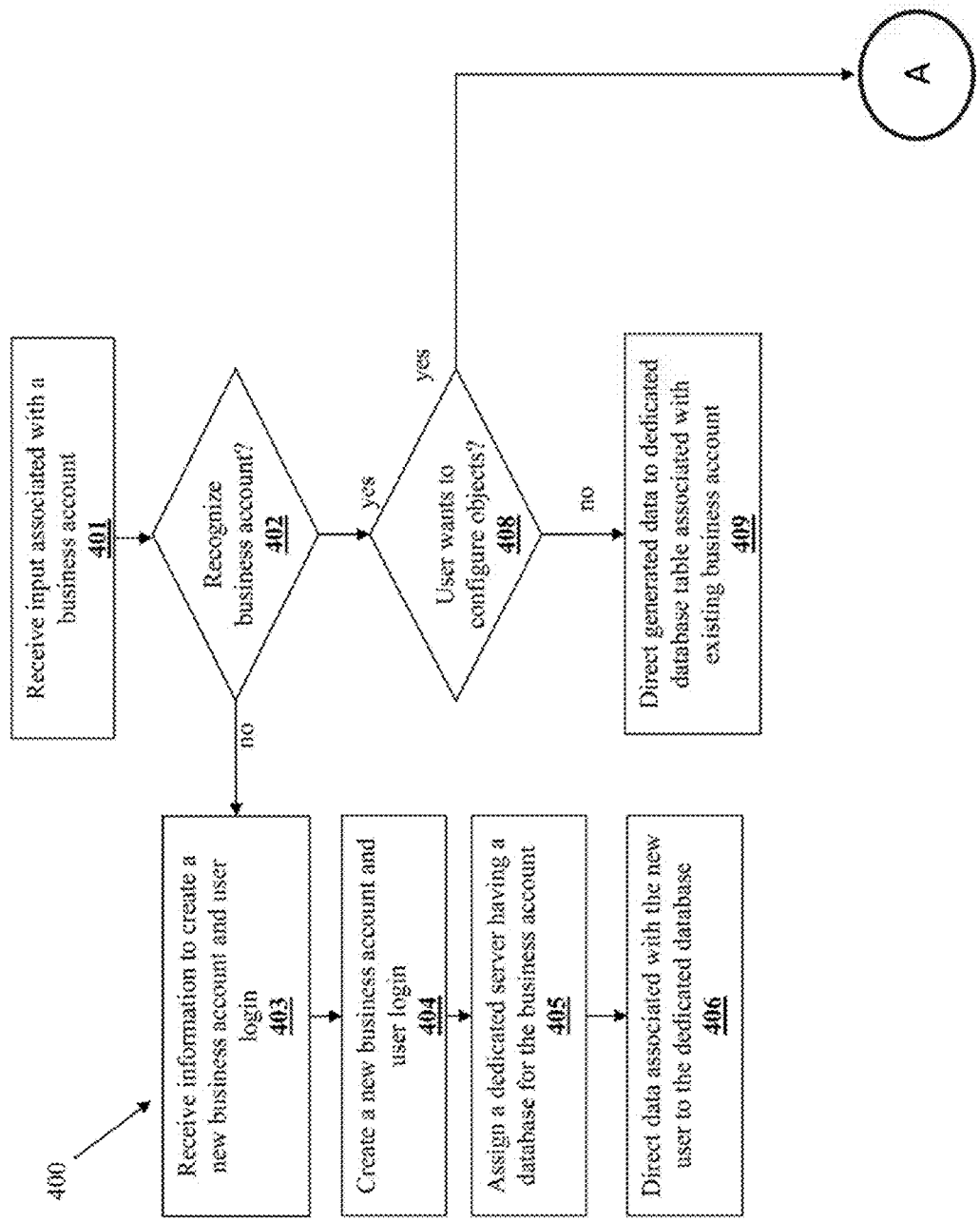
FIGS. 4a-4c illustrate an example flowchart of actions taken by the SaaS platform to retrieve data from external data sources according to one or more embodiments.
Figure 4B:
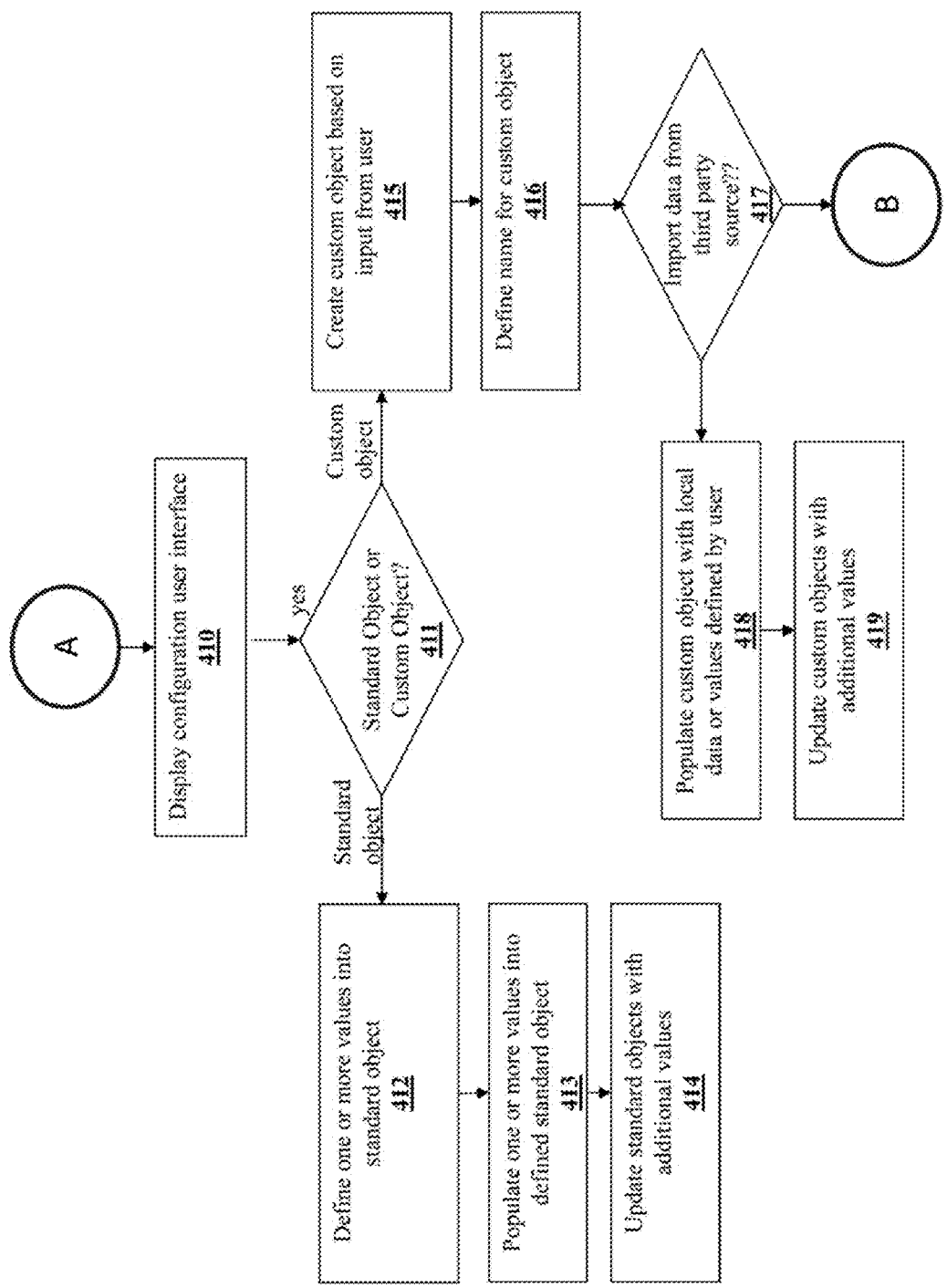
Figure 4C:
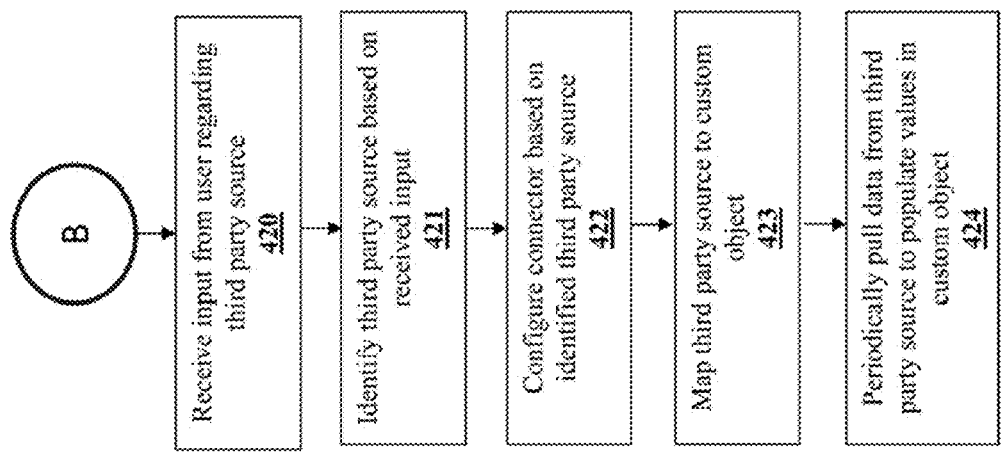

Referring now to FIG. 4a-4c, an example process 400 of importing third party data is described. At 401, the SaaS enterprise platform receives input associated with a particular business account. For example, a user associated with a business account may login. Or, a user may want to open a new business account with the SaaS platform. It should be appreciated that the business account is typically one for an entire business, and may have multiple users logging into the same business account. This is important for privacy and security of the information stored at the SaaS platform. For example, following the example of company ABC described above, the privileges (or role) of the sales manager may be different than that of the sales rep. The privileges of various employees of a company may be predetermined by a system administrator of the business account when setting up the system, in one embodiment. The sales manager may have greater access to existing data associated with the business account than what the sales representative, in one instance. Thus, multiple users have different roles within a company can efficiently access and interact with the system within a single business account.

At 402, the system determines if the user is recognized based on the authorization credentials submitted to the system. If the credentials are not recognized, at 403, the system may receive information to create a new business account. For example, the system may request information about the user's company, payment information, desired options, desired configurability, etc. At 404, a new business account and login is created for the new user.

At 405, the system creates a dedicated server instance and database instance for the new business account, as per the virtual tenancy database model. At 406, any data originated or populated by the new used may be directed to the dedicated server instance newly created for the new user.

If, at 402, the system recognizes the user, the user is authenticated by the system and allowed to access the business account, as well as configure one or more objects. At 408, the system may determine if the user wants to configure one or more objects. This step may be performed initially by the user, right after set-up. For example, a new user may want to configure one or more database tables based on the company's unique requirements. If, the user does not want to configure one or more objects, the user, at 409 is taken to the business user interface 202, and is allowed to interact with the system (i.e., populate values in one or more reports, visualize data, perform analysis, etc.). Any data originated through the user session is directed to the server instance and database instance unique to the business account.

If, at 408, input is received indicating that the wants to configure one or more objects, the user may be displayed a configuration user interface, in one or more embodiments (410). At 411, the user selects either a standard object or a custom object to configure. It should be appreciated that other configuration options may be similarly available to the user, and these two options are used here for illustrative purposes only. If a standard object is to be configured, at 412, the user may be taken to a separate user interface that enables the user to define one or more values for the standard object. In one or more embodiments, the user may simply select from a list of standardly available standard objects (e.g., Opportunities, Sales, Annual sales, etc.) At 413, one or more values may then be populated into the standard object. For example, if a particular standard object has been defined for "Price," one or more values related to price may be populated into the database table.

At 414, the standard object may be updated with additional values over time. In other words, each time the user logs in, and maintains the database table, new values may be updated, and the standard object is maintained with respective data values over time.

If, at 411, input is received indicating configuration of a custom object, the user may be taken to a separate user interface. Or, in other embodiments, the standard and custom objects may be configured through the same user interface. At 415, a custom object may be created based on input from the user. At 416, the user may define a name for the custom object. For example, a large company may create separate custom objects for sales figures at various regions around the country (e.g., Sales-California, Sales, Nebraska, etc.). These objects may not be readily available through the standard objects that are part of the SaaS service offering, but custom objects allow users to create their own tables unique to their business.

At 417, the system determines if third party data is to be imported into the custom object. In one or more embodiments, custom objects may be populated in the same way as standard objects (i.e., through the user's interaction with the business account). If, at 417, no third party data is to be imported, the system allows users to populate one or more desired values into the custom object (418). At 419, additional values are populated into the custom object over time.

However, if at 418, it is determined that third party data is to be imported, the system received input from the user regarding a third party data source. For example, the user may be taken to a separate third-party-import user interface. The user may then be able to define a third party source of interest. For example, the third party source may be another enterprise application, say a marketing focused SaaS application, for example. Or, in another example, the third party source may be a social media page associated with the customer, say a Twitter® feed. The user may provide a specific URL from which to import data, in other embodiments.

At 422, the system may configure one or more connectors based on the desired third party source, and map the third party source to the connector, and the connector to the desired custom object (423). At 424, the system may periodically pull data from the third party source and into the custom object based on the configuration of the custom object.

Figure 5:
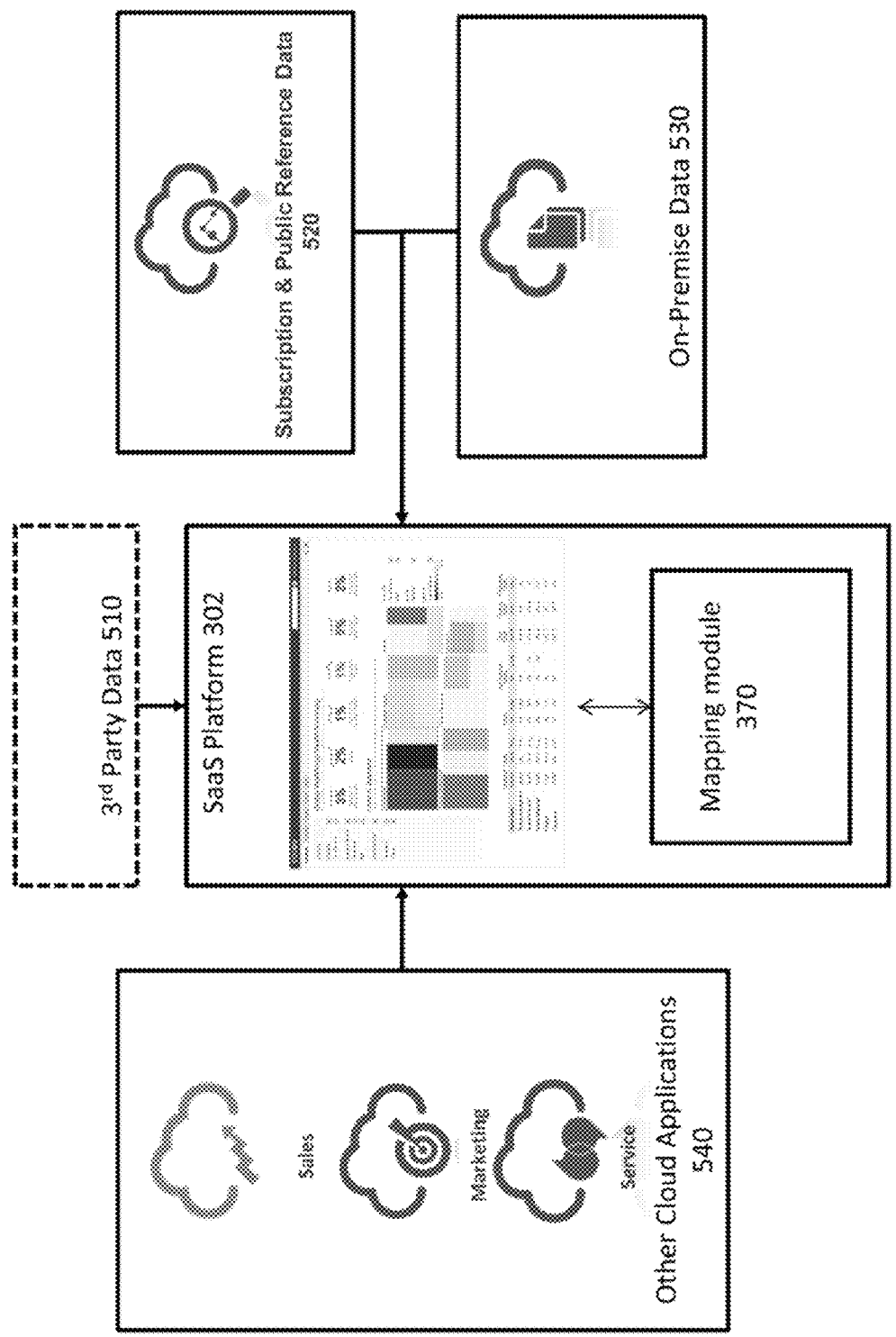
FIG. 5 illustrates an example of different type of external data source from which data can be retrieved according to one or more embodiments.

Referring now to FIG. 5, the SaaS enterprise platform 302 advantageously integrates on-premise data, data from other enterprise applications as well as third party data into one platform. As shown in FIG. 5, the SaaS platform 302 interfaces with the mapping module 370 to retrieve data from a number of sources. In one or more embodiments, data may be retrieved from other enterprise applications 540 (e.g., sales applications, marketing applications, service applications). For example, Oracle Inc. has a number of enterprise services catered towards specific enterprise needs, including enterprise applications directed to sales, enterprise applications related to HR (human resources) enterprise applications related to marketing, among others. These applications may either be on-premise applications, or may reside in the cloud. In either case, the SaaS enterprise platform 302 includes configurable connectors that can pull data from these on-premise or cloud data sources. The enterprise platform 302 may also use connectors to pull data from on-premise data sources 530, as discussed above. For example, enterprise specific data (e.g., on-premise sales data, etc.) may be advantageously pulled in and integrated into the SaaS enterprise platform 302.

In one or more embodiments, the SaaS enterprise platform 302 may also retrieve data from subscription or public reference data 520 through configured connectors. For example, customers of the enterprise platform may want to retrieve data from a government agency (e.g., regulatory information) to better understand the legal climate facing the company. Or, in another example, customers may want to retrieve data about stock prices of their competitors to be better informed in taking business decisions. One or more connectors can be configured such that data is pulled from these public reference or subscription data sources.

In one or more embodiments, the SaaS enterprise platform 302 may also retrieve third party data 510 through the use of connectors. For example, a customer of the enterprise platform 302 may pull in data from the company's Twitter® feed such that it is easily accessible through the enterprise platform, and the user can easily view the latest happenings and/or announcements related to the company. In another example, the third party data source may be another enterprise SaaS application that the customer has an account with, and the user may want to pull in data from tables in other enterprise application and integrate that data into the SaaS enterprise application 302. For example, the user may be a subscriber of Oracle BI applications but may use another third party application for human resources management. However, with the help of connectors, data on the third party application may be advantageously imported into the Oracle BI application such that the user can take HR matters into account when making decisions on the Oracle BI application.

Figure 6:
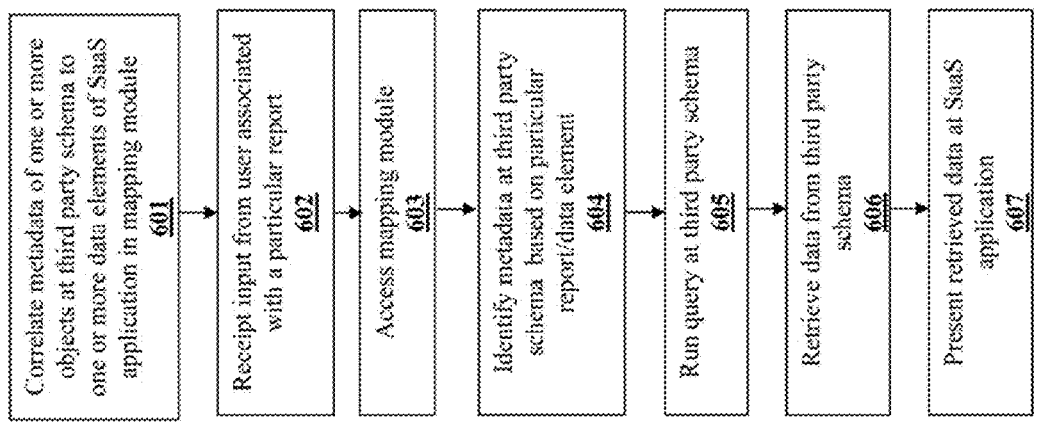
FIG. 6 illustrates a flowchart of actions taken to map an external data source according to one or more embodiments.

FIG. 6 is an example process flow illustrating how data is retrieved from external sources. At 601, metadata associated with one or more data objects of an external source is correlated with a particular connector and with one or more data elements of a particular report of the enterprise platform 302. For example, during set-up, a system administrator may identify a particular third party source, identify a metadata associated with one or more tables of the schema of that third party source and correlate the metadata to a one or more data elements of a particular BI report. This mapping information is stored in the mapping module and frequently consulted when third party data is to be retrieved. Thus, the mapping module may be continually updated with information related to one or more external sources. The mapping may be a one to one mapping, one to many mapping or many to many mapping. In any case, the mapping module is populated with relevant metadata information of the third party source such that the appropriate third party data source is pulled in.

At 602, the enterprise platform 302 may receive input from the user regarding a particular report of interest. For example, the user may click on a side-tab at a user interface of the enterprise platform 302 to view a desired third party data. More information on example user interfaces will be described further below.

At 603, the enterprise platform 302 accesses the mapping module to retrieve the correct external data. At 604, the metadata associated with the appropriate external data is identified based on the data element selected by the user. At 605, equipped with the information on the metadata, the connectors associated with the identified external data source communicate with the external data source and a query is run on the identified table of the scheme of the external source. At 606, the query returns a set of results, retrieving the appropriate information, and data is retrieved from the external source to the enterprise platform 302. At 607, the external data is presented to the user through one or more user interfaces.

Figure 7:
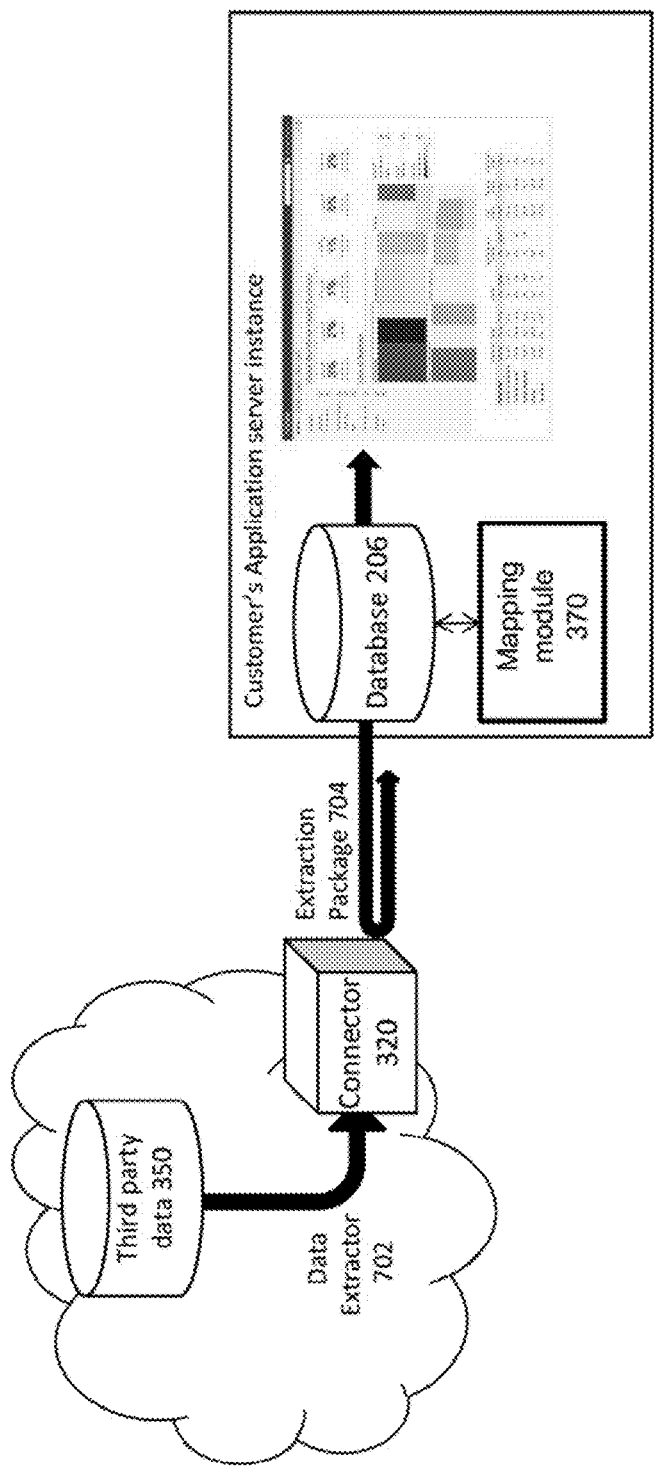
FIG. 7 illustrates a plan view of data being retrieved from an external data source through a connector according to one or more embodiments.

FIG. 7 is an example architecture diagram illustrating retrieval of data from one or more external sources. Although FIG. 7 illustrates a single connector communicating with a single third party source 350 for illustrative purposes, it should be appreciated that other embodiments comprise multiple connectors communicating with multiple external data sources to timely retrieve data as needed.

The mapping module 370 may identify the connector and the metadata of the third party source, based on which the connector 320 communicates with its designated source. As described above, a query may be run in the schema of the third party source 350 to retrieve data from one or more database tables at the third party source (e.g., through a data extractor 702). This data may be conveyed to the database 206 in the server instance associated with the particular customer. A data extraction package 704 may be applied to extract relevant metadata to perform routing to the correct destination.

When the data is received at the database 206 associated with the particular customer, it may be stored in a designated custom object, as described above. This data may then be populated on a user interface that is presented to the user. Thus, data from external sources may be replicated and stored on the customer's designated database table such that it may be retrieved as needed.

Referring now to FIG. 8, an example user interface associated with the enterprise platform 302 is shown. As shown in the illustrated embodiment, the enterprise platform 302 may be accessed through a number of devices and may function across a variety of platforms. Given that users of the enterprise platform are frequently on-the-go, the enterprise platform is designed in an intuitive manner such that it is accessed and used not only through traditional web-browsers at a desktop or laptop device, but also through other user friendly platforms, such as tablets and smart-phones. In the illustrated embodiment, the enterprise platform 302 may be accessed through a tablet device 802. The visual format of the enterprise platform makes it easier for users to interact with the enterprise platform in a number of environments, and not only in a traditional office set-up.

FIG. 8 also shows an example user interface 804 that presents analytical and transactional information to the user. With regards to one or more embodiments of the current invention, the enterprise software application may be developed using ADF but may strategically include elements of other applications (e.g., analytical tools like Oracle Business Intelligence (BI), etc.) Oracle ADF is based upon the model-view-controller architecture, which is known and documented. See, for example, "Oracle ADF 11 g Primer; Introduction to the building blocks of a Fusion Web application" (An Oracle White Paper, April 2007), incorporated herein by reference.

The model-view-controller architecture isolates business logic (e.g., data) from user interface considerations, resulting in an application or user interaction environment where it is easier to modify either the visual appearance of a user interaction environment or the underlying business rules without affecting the other. In the model-view-controller architecture, the model represents the information (the data) of the application and the business rules used to manipulate that data, the view corresponds to the elements of the user interface such as text, check box items, and so forth, and the controller manages details involving the communication to the model of user actions such as keystrokes and mouse movements. Although Oracle ADF is provided as an example, the invention described herein may be utilized in other environments. However, for ease of description, some examples herein involve use of Oracle ADF.

As shown in FIG. 8, the user interface 804 may comprise one or more side-tabs 806 that may be actuated by the user. Although the following disclosure uses side-tabs for illustrative purposes, it should be appreciated that any other suitable selectable user-interface component may be similarly used.

The side-tabs may be configured during set-up or at a later configuration stage to include data most relevant to the user. In the illustrated embodiment, user interface 804 includes six side-tabs 806. In one or more embodiments, the enterprise platform 302 may be hardcoded to include a given number or side-tabs, or the number of side-tabs may be configured by the user as well. The content of the side tabs may also be configured by the user to include on-premise data, or even third party data, as will be described in further detail below.

Figure 9A:
Figure 9B:
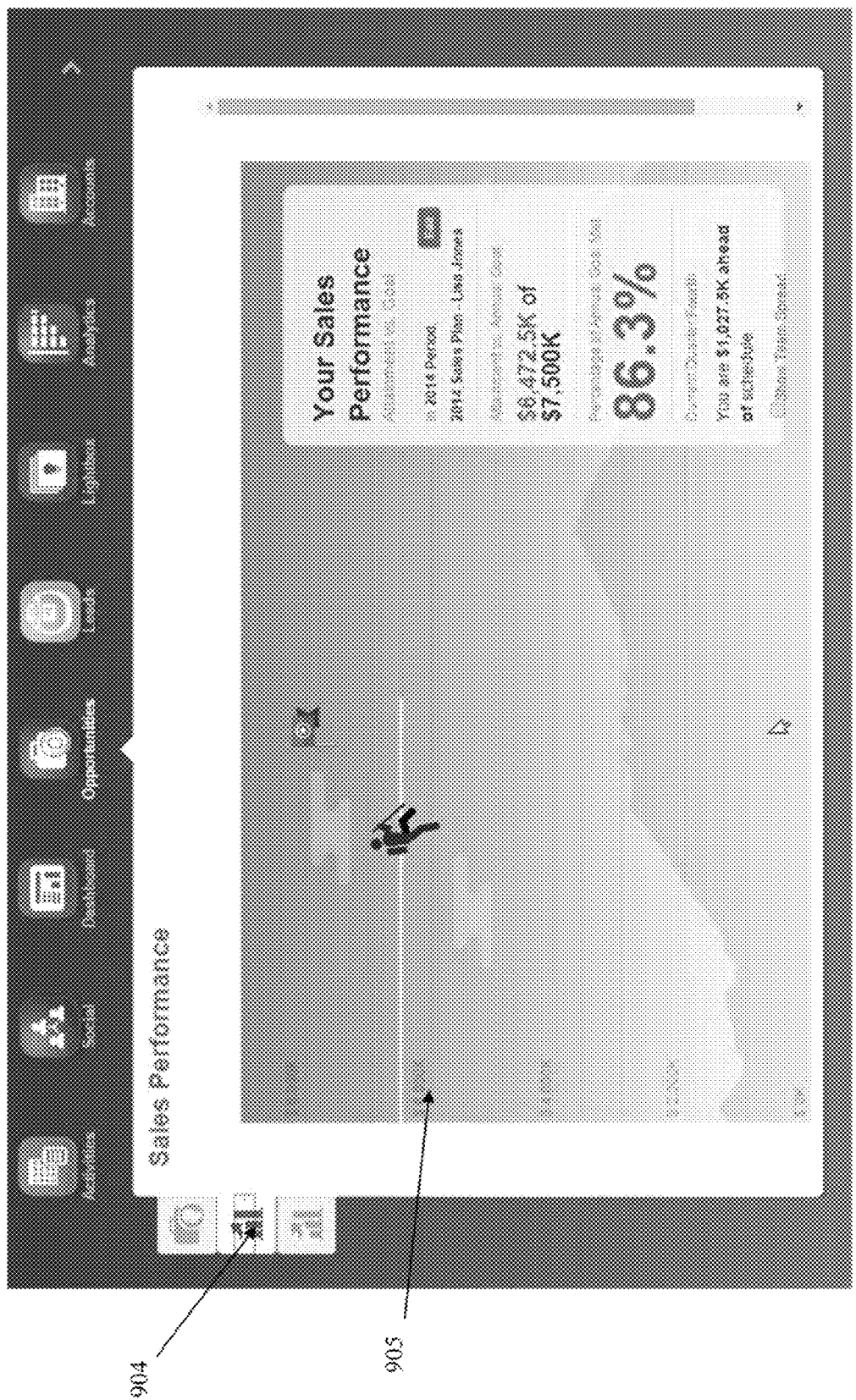

Referring now to FIG. 9a-9c, a series of user interfaces will be described to illustrate the use of side-tabs. FIG. 9a illustrates a list view user interface that presents the user with a list of Opportunities when side-tab 902 is actuated. It should be appreciated that the content of the user interface may change based on a user's role within a company and/or other access privileges defined by a system administrator of a company. Here, assuming the user is a sales rep, the list of opportunities allows the user to view and interact with possible salves opportunities and to gather all the sales-related information in a consolidated location.

The list view user interface corresponding to side-tab 902 presents users with one way of visualizing the data. The list view, for example allows the user to see a set of relevant details (e.g., win percentage, amount, sales stage, etc.). Other side tabs may be similarly actuated to view user interfaces presenting data in a different visual format, or presenting other data relevant to the sales rep.

Referring now to FIG. 9b, when side-tab 904 is actuated, another user interface 905 presents the sales rep's performance in visual form. Rather than viewing sales information as a list, user interface 905 allows the sales rep to visually appreciate his/her progress up-to-date and how many more opportunities are needed to fulfill a given goal.

Referring now to FIG. 9c, when side-tab 906 is actuated, yet another user interface 907 presents the sales rep with other information related to performance in a different visual form. Here, the user is presented with a visual gauge that allows the user to visually compare progress versus expectation/goals. Presented with information in such a visual format, the user can easily deduce necessary sales figures and obtain an analytical chart on his/her performance. Thus, the side-tabs are easily configurable at setup time such that analytical, transactional, third party data may all be populated and accessed through a simplified user interface.

Figure 10A:
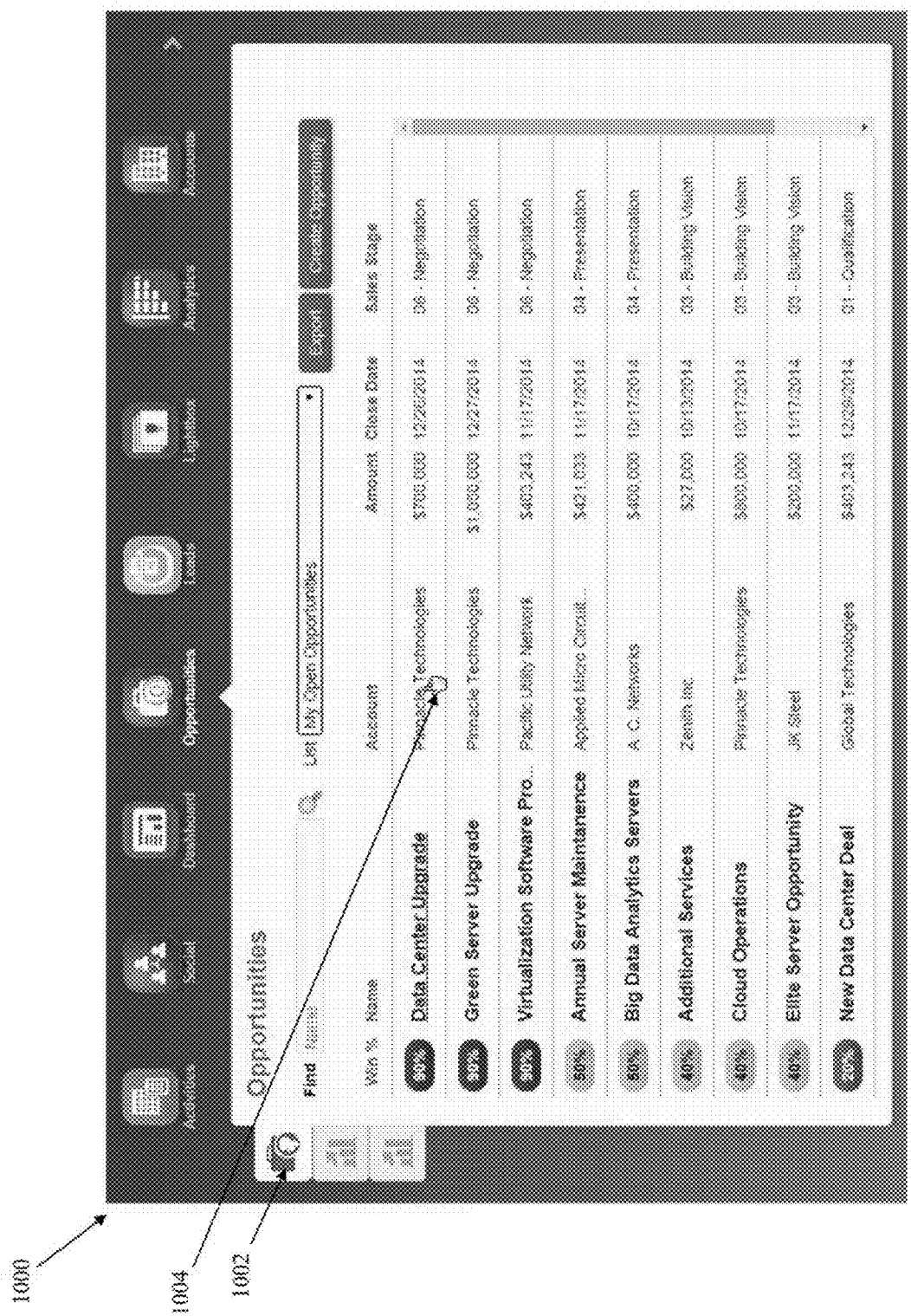
FIGS. 10*a*-10*d* illustrate another example series of user interfaces of the SaaS platform according to one or more embodiments.

FIGS. 10a-10d illustrate a series of user interfaces associated with side-tabs that incorporate third party data. Referring to FIG. 10a, while on the list view user interface 1002 (similar to user interface 9a), the user may desire to view more information on a company of interest (e.g., Pinnacle Technologies). In one or more embodiments, a cursor 1004 may be used to actuate a selectable Company field. In the illustrated embodiment, "Pinnacle Technologies" may be actuated.

Figure 10B:
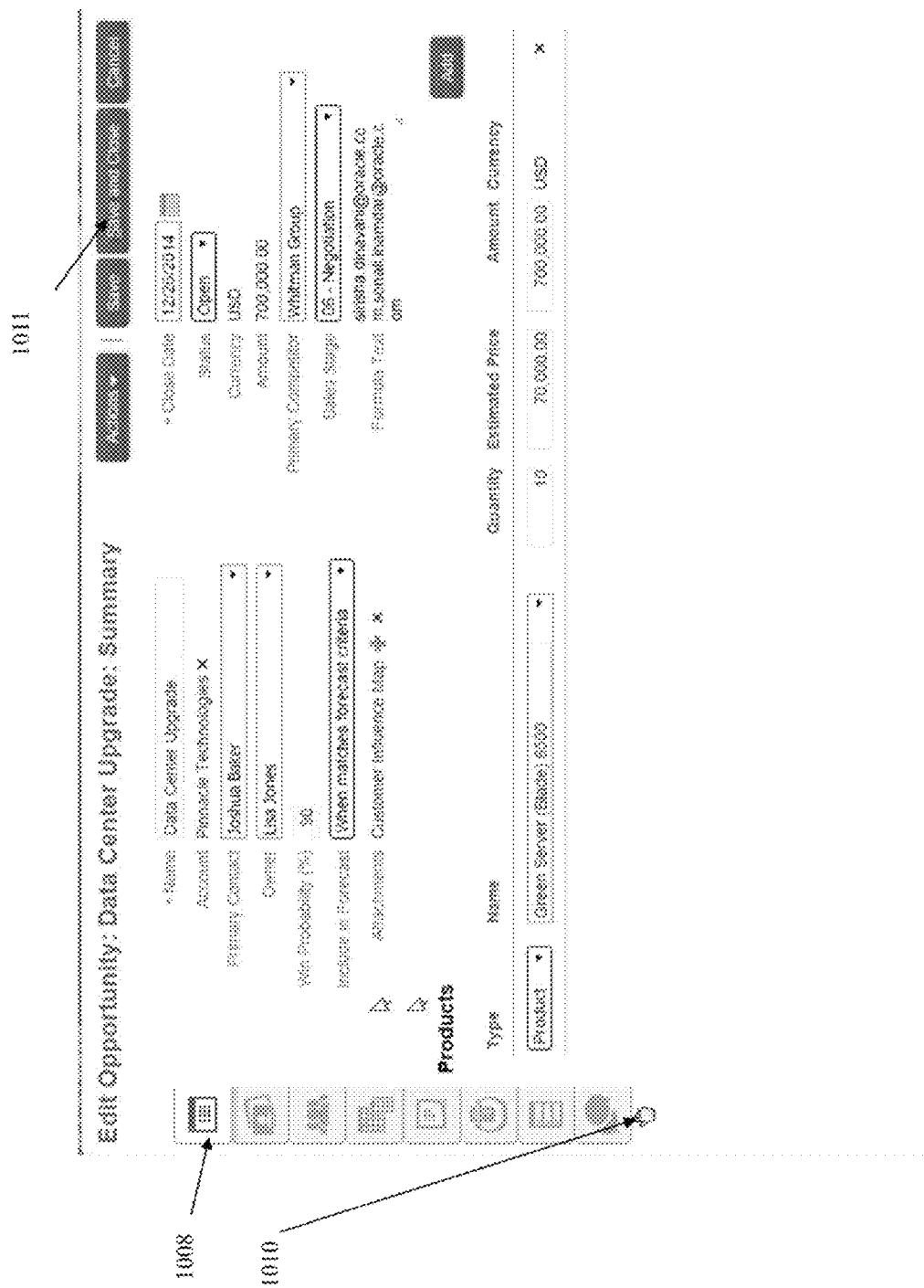

In response, the user may be taken to a user interface detailing information collected on the "Pinnacle Technologies," as shown in FIG. 10b. As shown in FIG. 10b, a number of side tabs 1008 may be actuated through an actuating tool 1010 to select one or more side-tabs of interest. As was the case in the previous example, the side-tabs may be used to consolidate a variety of information about a particular company in one location. For example, one of the side-tabs may refer to sales figures associated with the company. Another side-tab may be associated with analytical information on the sales figures. Yet another side-tab may include the company's Twitter® feed such that the user can view any social media updates on the company immediately rather than opening up another browser to separately view the company's Twitter account.

Figure 10C:
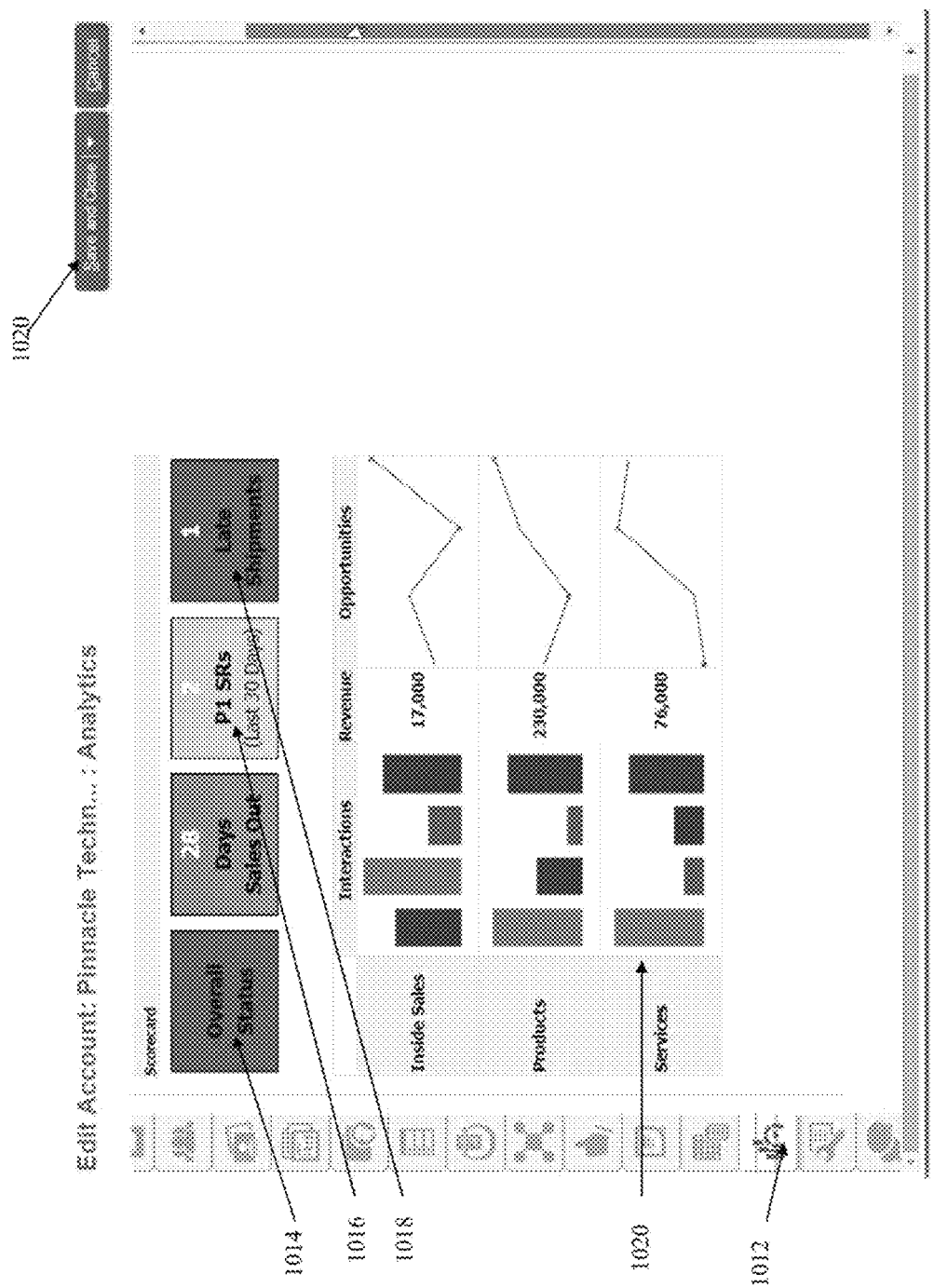

Referring now to FIG. 10c, side-tab 1012 has been actuated, presenting the user with information gathered from multiple third party sources. Side tab 1012 presents a "Scorecard" of various aspects of the company, including overall status, number of late shipments 1018, number of P1 SRS 1016, number of days sales out. It should be appreciated that while some of the information of the scorecard may be locally stored in the enterprise platform 302, other data may come from third party sources that are retrieved using the process described in detail above. For example, data on number of late shipments may come from a shipment-related external database that the enterprise platform 302 is configured to connect to in order to retrieve the necessary data.

In the same interface, data on number of days sales out may be retrieved from another external sales application. Similarly, analytical data 102 may be retrieved from an analytical tool (e.g., BI) and populated into the Scorecard user interface. However, all the data gathered from these disparate sources may be advantageously integrated into one user interface, such as the one shown in the scorecard interface of FIG. 10c.

Figure 10D:
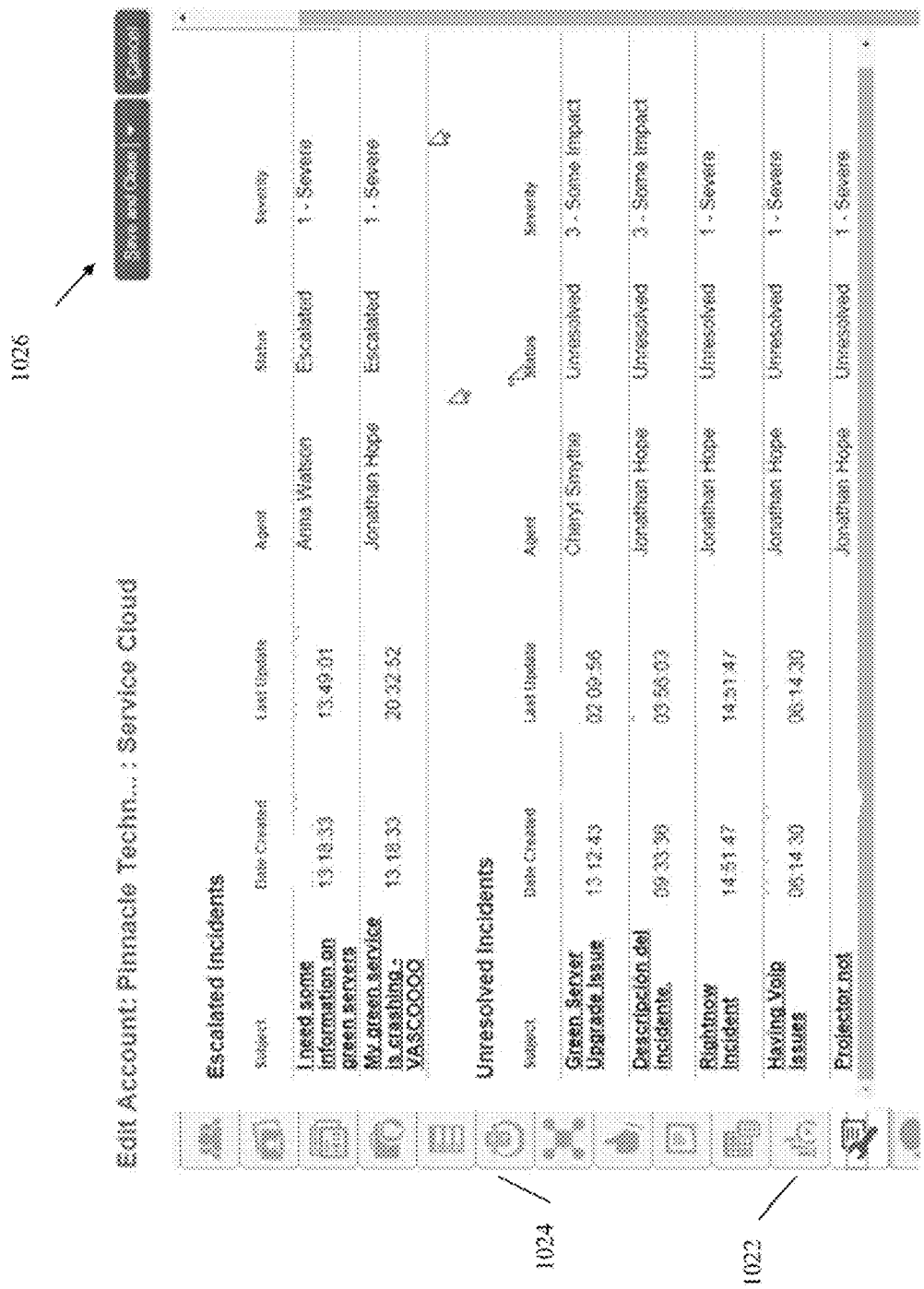

Referring to FIG. 10d, user interface 1024 is presented when side-tab 1022 is actuated. User interface 1024 illustrates service request data for a given product. For example, if the user is a sales manager of a company, the user can easily access the service requests information through the side-tab to see the number and type of service requests that are being requested for a particular product. This information, in turn may provide the user with understanding of how a particular product is doing in the market, what products, or components of products are doing well, while which ones need to be improved. Or, the service requests may indicate to the user how many technicians to put on the field depending on demand. Similarly, many such use cases can be envisioned.

By allowing users to configure the enterprise platform in a manner such that any data source (internal or external) can be brought in and integrated into one simplified user interface, the SaaS enterprise platform 302 may be optimally fine-tuned for the specific needs of the customer. As described in detail above, this is largely made possible due to the virtual tenant data architecture of the SaaS enterprise platform 302 that allows customers to bring in large amounts of data from third party sources (and internal sources) without negatively affecting performance of other customers of the SaaS enterprise platform.

Figure 11:
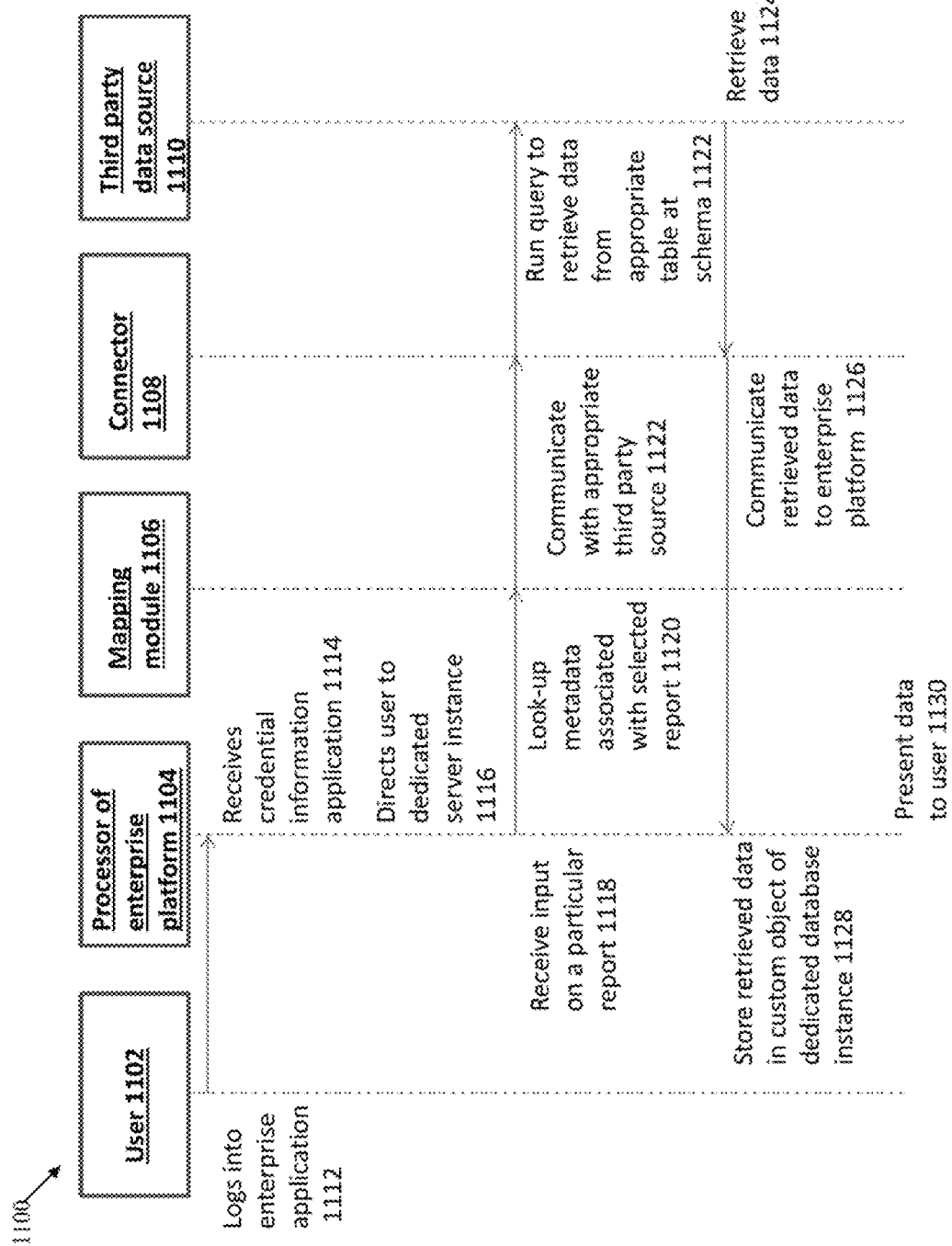
FIG. 11 is an example flowchart of actions taken to retrieve external data according to one or more embodiments.

Referring now to FIG. 11, a process flow 1100 illustrating an example method of integrating third party data is shown. At 1112, a user 1102 logs into the SaaS enterprise platform. At 1114, the SaaS enterprise platform 1104 receives the users credential information, and directs the user to the user's dedicated server instance (1116). It should be appreciated that any data generated out of the user session is directed to the database instance specific to the user, as per the virtual tenancy model.

At 1118, the enterprise platform may receive a particular user input from the user. For example, the user may select a particular side tab similar to the ones shown in example user interfaces of FIG. 9 and FIG. 10. The enterprise platform 1104 may run a particular report based on the user's input. At 1120, based on the received input, the mapping module 1106 may be consulted to look-up a corresponding metadata of a third party data source to be retrieved in response to the data element or report desired by the user. At 1122, the appropriate connector 1108 is employed, and the connector 1108 communicates with the desired third party source.

At 1124, a query is run at a schema of the third party source to retrieve one or more data objects from database tables at the schema. At 1126, the data is retrieved based on the query. At 1126, the connector 1108 communicates the retrieved data back to the enterprise platform 1104. The retrieved data may be stored in the database instance associated with the user (1128). At 1130, the retrieved data may be presented to the user through the user interface (e.g., a user interface may be populated for the selected side-tab showing the desired third party data).

Given that third party data is continually changing, an update mechanism may be built into the enterprise platform 302 to ensure that the customer is presented with the most up-to-date information from the third party source. In one or more embodiments, the system may be configured such that third party data is always retrieved in real-time (i.e., the system goes through the process of retrieving third party data every time a particular report is run). In other embodiments, the system may be configured such that an update is scheduled for the third party data. For example, a schedule job (e.g., PL/SQL statement) may be defined for a particular time period such that data is retrieved from the third party source at the scheduled time, and the data is duly updated in the dedicated database table associated with the customer. Or, in another embodiment, third party data may be retrieved on an event basis. For example, the system may detect that a particular opportunity is open, and retrieve configured third party data for the event (i.e., open opportunity) in real-time, while third party data for other data objects may simply be schedule jobs. In yet another embodiment, third party data maybe manually retrieved.

Figure 12A:
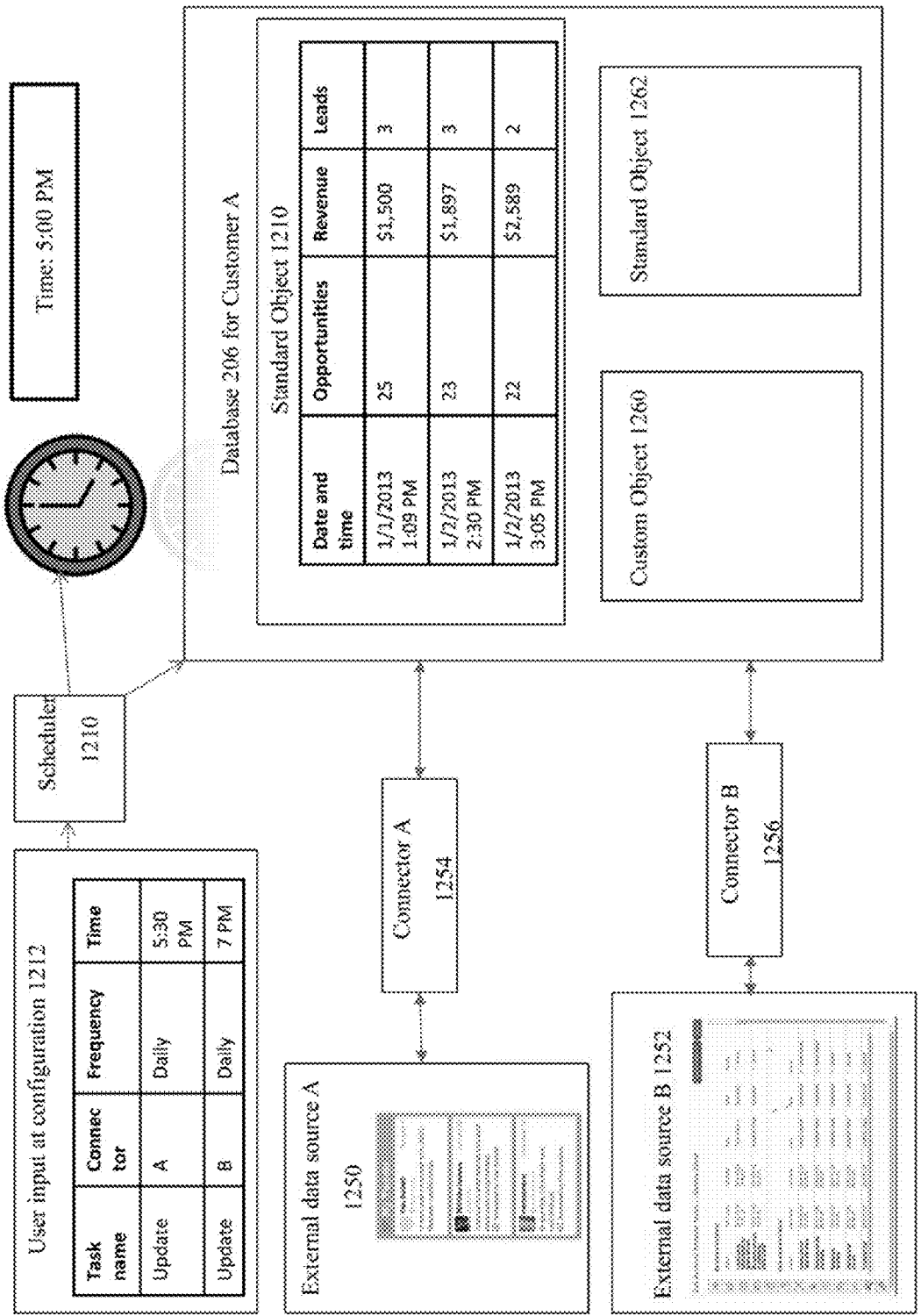
FIGS. 12*a*-12*c* illustrate a process flow of scheduling retrieval of external data according to one or more embodiments.
Figure 12B:
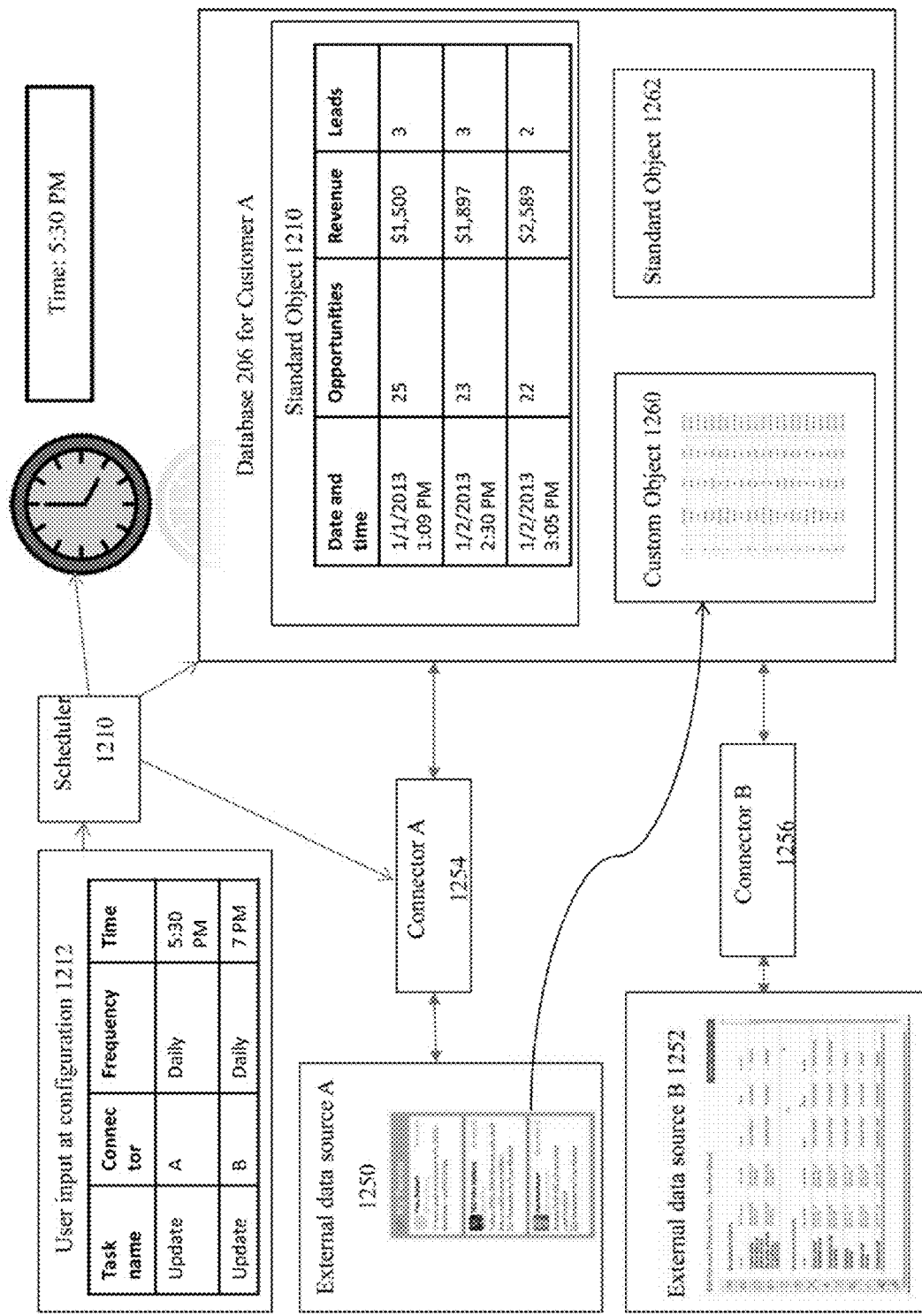
Figure 12C:
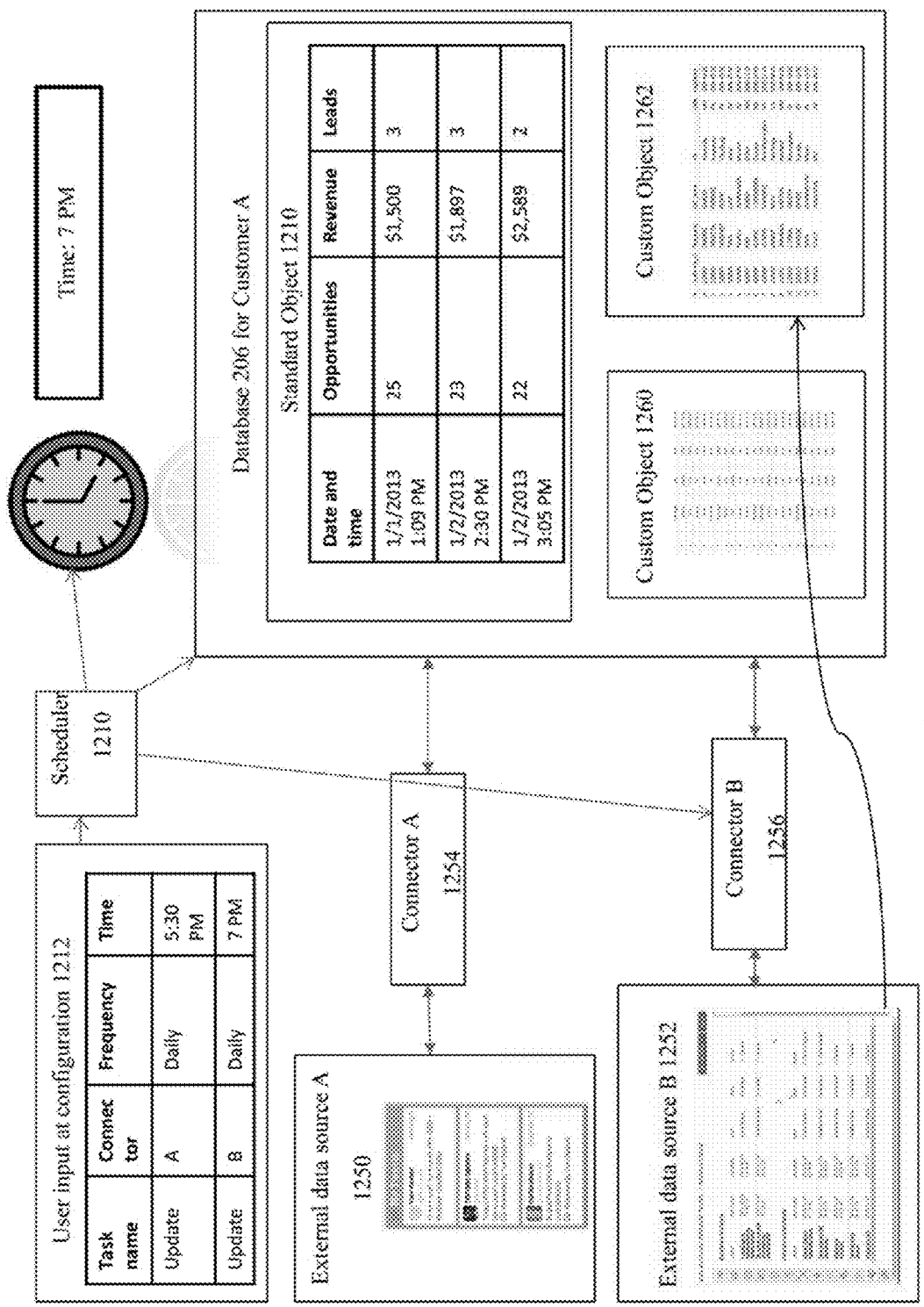

FIGS. 12A-12C illustrate an example of periodically updating third party data into custom objects at the database instance dedicated to the customer. In the illustrated embodiment, two external sources 1250 and 1252 are shown, but it should be appreciated that any number of external sources may be similarly used. In the illustrated embodiment, user input has already been received at a configuration screen 1212. The configuration screen 1212 allows the user to configure one or more options regarding what type of data should be retrieved, where the data should be retrieved from, the frequency at which data is updated at the database tables, and other such options. Here, the configuration screen 1212 defines two schedule jobs at which external source data is updated into the database associated with customer A. The scheduler A may be a PL/SQL execution statement that executes a given task based on a timer, for example.

As shown in the FIG. 12A, the database instance 206 dedicated to customer A includes multipole database tables. Some database tables are standard objects 1210, while others are custom objects 1260 and 1262. The illustrated embodiment also shows the database enterprise platform communicating to external sources A and B through connectors A and B (1254 and 1256, respectively). In FIG. 12A, at 5 PM, the custom objects are not yet updated with external source data because the schedule job only runs at the configured times of 5:30 PM and 7 PM.

Referring now to FIG. 12 B, the time is now 5:30 PM. The scheduler 1210 is configured to communicate with the connector 1254 such that the connector retrieves data from the external data source A, based on consultation with a mapping module (not shown). As shown in FIG. 12 B, custom object 1260 is populated with data retrieved from external source A. At 7 PM, the scheduler 1210e executes a task such that the connector 1256 retrieves data from the external source B. As shown in FIG. 12 C, at 7 PM, custom object 1262 is populated with data retrieved from external source B.

Figure 13:
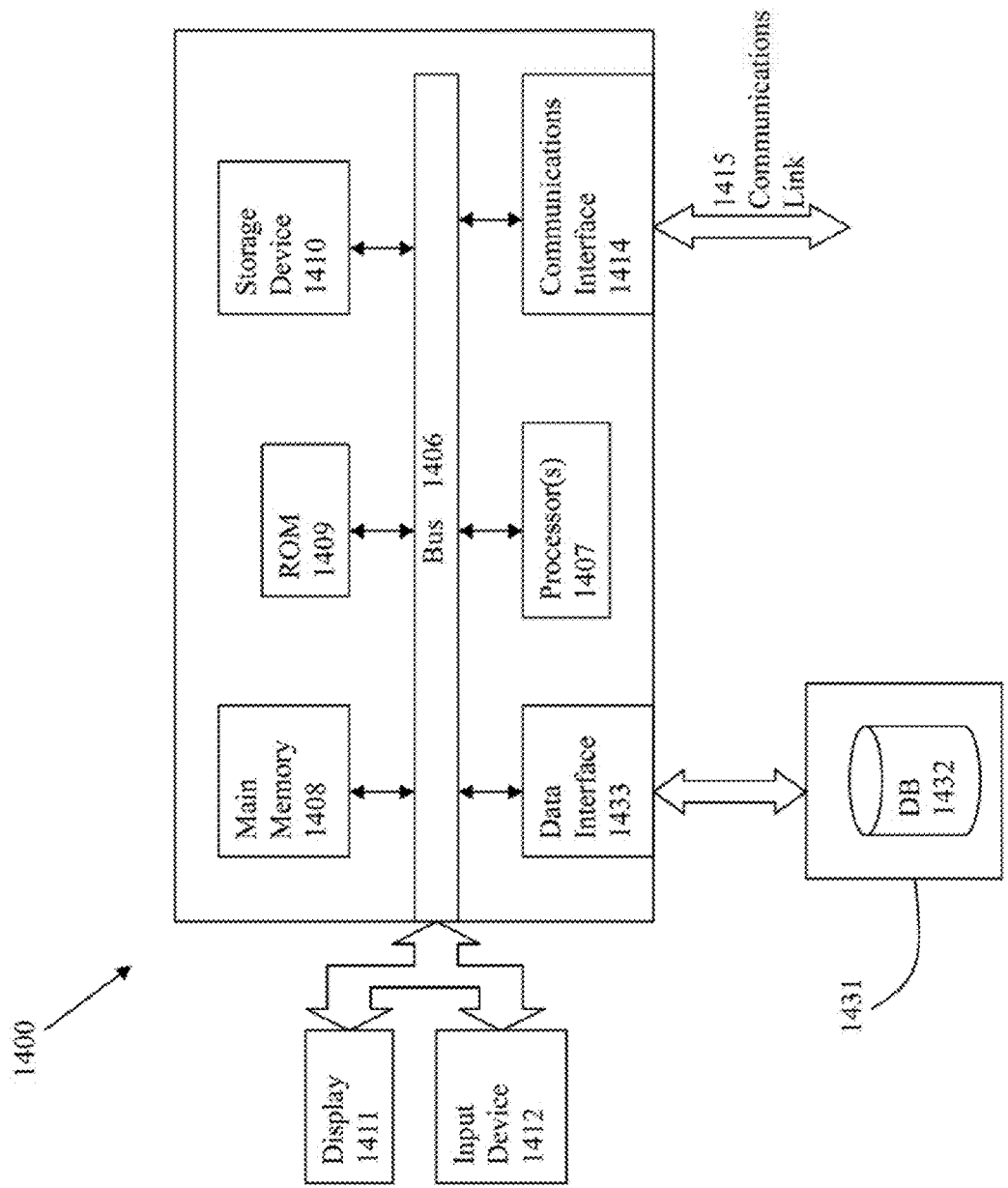
FIG. 13 depicts a computerized system on which an embodiment can be implemented.

FIG. 13 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention(s) are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention(s) are performed by a single computer system 1400. According to other embodiments of the invention, two or more computer systems 1400 coupled by communication link 1415 (e.g., LAN, PTSN, or wireless network) may perform the sequence of instructions required to practice the invention(s) in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention(s) have been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
providing a software as a service (SaaS) platform to a plurality of customers corresponding to a plurality of accounts, wherein information associated with a particular account is directed to a dedicated database included within a server instance uniquely assigned to the particular account, wherein different accounts of the plurality of accounts are uniquely assigned different server instances having different databases;
configuring a connector in the server instance uniquely assigned to the particular account to retrieve data from an external data source;
retrieving data from the external data source using the connector in the server instance uniquely assigned to the particular account, data from the external data source comprising retrieved data;
storing the retrieved data in a portion of the dedicated database of the server instance uniquely assigned to the particular account, the retrieved data being initially stored solely in the dedicated database of the server instance uniquely assigned to the particular account; and
providing a user interface having one or more selectable components, wherein at least one selectable component of the one or more selectable components, when selected, displays at least some of the data retrieved from the external data source, the SaaS platform performing analysis and reporting on data from the external data source stored in the dedicated database by storing the retrieved data in the portion of the dedicated database of the particular account and not in a database shared with other accounts, the server instance uniquely assigned to the particular account further comprising a scheduler, the scheduler specifying when the retrieved data is to be retrieved from external data sources according to a scheduling value received from a configuration interface, the configuration interface provides for specification of the external data source, of a type of the data from the external data source to be retrieved, and when to retrieve the data from the external data source.

2. The method of claim 1, further comprising:
creating, based at least in part on input received from a particular customer, a database table for storing the retrieved data.

3. The method of claim 1, further comprising:
identifying metadata for one or more data objects from the external data source; and
correlating the metadata for the one or more data objects from the external data source to one or more data elements of a database table of the dedicated database in the server instance uniquely assigned to the particular account to create mapping information.

4. The method of claim 3, wherein the mapping information corresponding to mappings between one or more connectors and standard objects, the data objects from the external data source to be stored as a standard objects or a custom object, the standard object comprising an object type utilized by two or more accounts of the plurality of accounts, and the custom object comprising an object type specific to a respective account of the plurality of accounts.

5. The method of claim 1, wherein the retrieved data is retrieved automatically.

6. The method of claim 5, wherein the retrieved data is retrieved based at least in part on an event.

7. The method of claim 1, further comprising:
creating, based at least in part on input received from a particular customer, a database table for storing the retrieved data;
identifying metadata for one or more data objects from the external data source;
correlating the metadata for the one or more data objects from the external data source to one or more data elements of a database table of the dedicated database in the server instance uniquely assigned to the particular account to create mapping information, the mapping information corresponding to mappings between one or more connectors and standard objects, the data objects from the external data source to be stored as a standard objects or a custom object, the standard object comprising an object type utilized by two or more accounts of the plurality of accounts, and the custom object comprising an object type specific to a respective account of the plurality of accounts;
second data being initially stored solely in a second dedicated database of a second server instance uniquely assigned to a second account, the second data being retrieved from a second external data source using a second connector in the second server instance; and
wherein:
the retrieved data is retrieved automatically,
the retrieved data is retrieved based at least in part on an event,
the external data source is an on-premises data source,
the external data source is a social media source,
the external data source is another SaaS platform,
the external data source is another cloud application,
the at least one selectable component is a side-tab control of the user interface,
data associated with the particular account is directed to the dedicated database in the server instance uniquely assigned to the particular account,
respective accounts of a plurality of accounts are accessible by multiple users and each respective user is associated with respective privilege data corresponding to access privileges, and
the user interface further comprises a selection component for selecting either a standard object or a custom object for configuration, and in response to selecting a custom object for configuration, providing a second user interface component for configuring the custom object.

8. The method of claim 1, further comprising second data being initially stored solely in a second dedicated database of a second server instance uniquely assigned to a second account, the second data being retrieved from a second external data source using a second connector in the second server instance.

9. The method of claim 1, wherein the external data source is a social media source.

10. The method of claim 1, wherein the external data source is another SaaS platform.

11. The method of claim 1, wherein the external data source is another cloud application.

12. The method of claim 1, wherein the at least one selectable component is a side-tab control of the user interface.

13. A computer program product embodied in a non-transitory computer readable medium, the computer readable medium having stored thereon a sequence of instructions which, when executed by a processor causes the processor to execute a method, the method comprising:
providing a software as a service (SaaS) platform to a plurality of customers corresponding to a plurality of accounts, wherein information associated with a particular account is directed to a dedicated database included within a server instance uniquely assigned to the particular account, wherein different accounts of the plurality of accounts are uniquely assigned different server instances having different databases;
configuring a connector in the server instance uniquely assigned to the particular account to retrieve data from an external data source;
retrieving data from the external data source using the connector in the server instance uniquely assigned to the particular account, data from the external data source comprising retrieved data;
storing the retrieved data in a portion of the dedicated database of the server instance uniquely assigned to the particular account, the retrieved data being initially stored solely in the dedicated database of the server instance uniquely assigned to the particular account; and
providing a user interface having one or more selectable components, wherein at least one selectable component of the one or more selectable components, when selected, displays at least some of the data retrieved from the external data source, the SaaS platform performing analysis and reporting on data from the external data source stored in the dedicated database by storing the retrieved data in the portion of the dedicated database of the particular account and not in a database shared with other accounts, the server instance uniquely assigned to the particular account further comprising a scheduler, the scheduler specifying when the retrieved data is to be retrieved from external data sources according to a scheduling value received from a configuration interface, the configuration interface provides for specification of the external data source, of a type of the data from the external data source to be retrieved, and when to retrieve the data from the external data source.

14. The computer program product of claim 13, further comprising:
creating, based at least in part on input received from a particular customer, a database table for storing the retrieved data.

15. The computer program product of claim 13, further comprising:
identifying metadata for one or more data objects from the external data source; and
correlating the metadata for the one or more data objects from the external data source to one or more data elements of a database table of the dedicated database in the server instance uniquely assigned to the particular account to create mapping information.

16. The computer program product of claim 15, wherein the mapping information corresponding to mappings between one or more connectors and standard objects, the data objects from the external data source to be stored as a standard objects or a custom object, the standard object comprising an object type utilized by two or more accounts of the plurality of accounts, and the custom object comprising an object type specific to a respective account of the plurality of accounts.

17. The computer program product of claim 13, wherein the retrieved data is retrieved automatically.

18. The computer program product of claim 17, wherein the retrieved data is retrieved based at least in part on an event.

19. The computer program product of claim 13, further comprising:
creating, based at least in part on input received from a particular customer, a database table for storing the retrieved data;
identifying metadata for one or more data objects from the external data source;
correlating the metadata for the one or more data objects from the external data source to one or more data elements of a database table of the dedicated database in the server instance uniquely assigned to the particular account to create mapping information, the mapping information corresponding to mappings between one or more connectors and standard objects, the data objects from the external data source to be stored as a standard objects or a custom object, the standard object comprising an object type utilized by two or more accounts of the plurality of accounts, and the custom object comprising an object type specific to a respective account of the plurality of accounts;
second data being initially stored solely in a second dedicated database of a second server instance uniquely assigned to a second account, the second data being retrieved from a second external data source using a second connector in the second server instance; and
wherein:
the retrieved data is retrieved automatically,
the retrieved data is retrieved based at least in part on an event,
the external data source is an on-premises data source,
the external data source is a social media source,
the external data source is another SaaS platform,
the external data source is another cloud application,
the at least one selectable component is a side-tab control of the user interface,
data associated with the particular account is directed to the dedicated database in the server instance uniquely assigned to the particular account,
respective accounts of a plurality of accounts are accessible by multiple users and each respective user is associated with respective privilege data corresponding to access privileges, and
the user interface further comprises a selection component for selecting either a standard object or a custom object for configuration, and in response to selecting a custom object for configuration, providing a second user interface component for configuring the custom object.

20. The computer program product of claim 13, further comprising second data being initially stored solely in a second dedicated database of a second server instance uniquely assigned to a second account, the second data being retrieved from a second external data source using a second connector in the second server instance.

21. The computer program product of claim 13, wherein the external data source is a social media source.

22. The computer program product of claim 13, wherein the external data source is another SaaS platform.

23. The computer program product of claim 13, wherein the external data source is another cloud application.

24. The computer program product of claim 13, wherein the at least one selectable component is a side-tab control of the user interface.

25. A computer system comprising:
a computer processor to execute a set of program code instructions; and
a memory to hold the set of program code instructions, the set of program code instructions when executed perform acts comprising:
providing a software as a service (SaaS) platform to a plurality of customers corresponding to a plurality of accounts, wherein information associated with a particular account is directed to a dedicated database included within a server instance uniquely assigned to the particular account, wherein different accounts of the plurality of accounts are uniquely assigned different server instances having different databases,
configuring a connector in the server instance uniquely assigned to the particular account to retrieve data from an external data source,
retrieving data from the external data source using the connector in the server instance uniquely assigned to the particular account, data from the external data source comprising retrieved data,
storing the retrieved data in a portion of the dedicated database of the server instance uniquely assigned to the particular account, the retrieved data being initially stored solely in the dedicated database of the server instance uniquely assigned to the particular account, and
providing a user interface having one or more selectable components, wherein at least one selectable component of the one or more selectable components, when selected, displays at least some of the data retrieved from the external data source, the SaaS platform performing analysis and reporting on data from the external data source stored in the dedicated database by storing the retrieved data in the portion of the dedicated database of the particular account and not in a database shared with other accounts, the server instance uniquely assigned to the particular account further comprising a scheduler, the scheduler specifying when the retrieved data is to be retrieved from external data sources according to a scheduling value received from a configuration interface, the configuration interface provides for specification of the external data source, of a type of the data from the external data source to be retrieved, and when to retrieve the data from the external data source.

26. The computer system of claim 25, wherein the acts further comprise:
creating, based at least in part on input received from a particular customer, a database table for storing the retrieved data.

27. The computer system of claim 25, wherein the acts further comprise:
identifying metadata for one or more data objects from the external data source; and
correlating the metadata for the one or more data objects from the external data source to one or more data elements of a database table of the dedicated database in the server instance uniquely assigned to the particular account to create mapping information.

28. The computer system of claim 27, wherein the mapping information corresponding to mappings between one or more connectors and standard objects, the data objects from the external data source to be stored as a standard objects or a custom object, the standard object comprising an object type utilized by two or more accounts of the plurality of accounts, and the custom object comprising an object type specific to a respective account of the plurality of accounts.

29. The computer system of claim 25, wherein the acts further comprise:
creating, based at least in part on input received from a particular customer, a database table for storing the retrieved data;
identifying metadata for one or more data objects from the external data source;
correlating the metadata for the one or more data objects from the external data source to one or more data elements of a database table of the dedicated database in the server instance uniquely assigned to the particular account to create mapping information, the mapping information corresponding to mappings between one or more connectors and standard objects, the data objects from the external data source to be stored as a standard objects or a custom object, the standard object comprising an object type utilized by two or more accounts of the plurality of accounts, and the custom object comprising an object type specific to a respective account of the plurality of accounts;
second data being initially stored solely in a second dedicated database of a second server instance uniquely assigned to a second account, the second data being retrieved from a second external data source using a second connector in the second server instance; and wherein:
the retrieved data is retrieved automatically
the retrieved data is retrieved based at least in part on an event,
the external data source is an on-premises data source,
the external data source is a social media source,
the external data source is another SaaS platform,
the external data source is another cloud application,
the at least one selectable component is a side-tab control of the user interface,
data associated with the particular account is directed to the dedicated database in the server instance uniquely assigned to the particular account,
respective accounts of a plurality of accounts are accessible by multiple users and each respective user is associated with respective privilege data corresponding to access privileges, and
the user interface further comprises a selection component for selecting either a standard object or a custom object for configuration, and in response to selecting a custom object for configuration, providing a second user interface component for configuring the custom object.

30. The computer system of claim 25, wherein the at least one selectable component is a side-tab control of the user interface.

* * * * *

UNITED STATES PATENT AND TRADEMARK OFFICE
CERTIFICATE OF CORRECTION

PATENT NO. : 9,971,803 B2
APPLICATION NO. : 14/611132
DATED : May 15, 2018
INVENTOR(S) : Rehman et al.

Page 1 of 1

It is certified that error appears in the above-identified patent and that said Letters Patent is hereby corrected as shown below:

In the Specification

In Column 1, Line 11, delete "14/611/132" and insert -- 14/611,132 --, therefor.

In Column 5, Line 44, delete "204, b," and insert -- 204b, --, therefor.

In Column 7, Line 58, delete "FIG." and insert -- FIGS. --, therefor.

In Column 12, Line 8, delete "FIG." and insert -- FIGS. --, therefor.

In Column 14, Line 60, delete "12 B," and insert -- 12B, --, therefor.

In Column 14, Line 64, delete "12 B," and insert -- 12B, --, therefor.

In Column 15, Line 1, delete "12 C," and insert -- 12C, --, therefor.

In Column 15, Line 49, delete "PTSN," and insert -- PSTN, --, therefor.

Signed and Sealed this
Eighteenth Day of December, 2018

Andrei Iancu
*Director of the United States Patent and Trademark Office*